(12) United States Patent
Kim et al.

(10) Patent No.: US 9,853,697 B2
(45) Date of Patent: Dec. 26, 2017

(54) TAG DETECTOR OF NEAR FIELD COMMUNICATION (NFC) DEVICE, NFC DEVICE AND MOBILE DEVICE INCLUDING THE SAME

(71) Applicant: SAMSUNG ELECTRONICS CO., LTD., Suwon-si (KR)

(72) Inventors: Jin-Woo Kim, Seoul (KR);
Byeong-Taek Moon, Seoul (KR);
Jun-Ho Kim, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/205,420

(22) Filed: Jul. 8, 2016

(65) Prior Publication Data
US 2017/0077996 A1    Mar. 16, 2017

(30) Foreign Application Priority Data
Sep. 14, 2015    (KR) .......................... 10-2015-0129462

(51) Int. Cl.
| | |
|---|---|
| *H04B 5/00* | (2006.01) |
| *H04B 5/02* | (2006.01) |
| *H02J 50/12* | (2016.01) |
| *H02J 7/02* | (2016.01) |
| *H04W 52/04* | (2009.01) |
| *H04W 88/02* | (2009.01) |

(52) U.S. Cl.
CPC ................ *H04B 5/02* (2013.01); *H02J 7/025* (2013.01); *H02J 50/12* (2016.02); *H04B 5/0031* (2013.01);
(Continued)

(58) Field of Classification Search
CPC ...... H04B 5/0031; H04B 5/0037; H04B 5/02; H04B 5/0075; H04B 5/00; H04B 5/0056;
(Continued)

(56) References Cited

U.S. PATENT DOCUMENTS

| | | | |
|---|---|---|---|
| 6,905,074 B2 | 6/2005 | Charrat | |
| 8,416,063 B2 | 4/2013 | Jung et al. | |
| 8,977,203 B2 | 3/2015 | Kato et al. | |
| 2009/0066482 A1 | 3/2009 | Kim | |
| 2013/0260676 A1* | 10/2013 | Singh | H04B 5/0037 455/41.1 |
| 2014/0227986 A1 | 8/2014 | Kanno | |
| 2015/0178526 A1* | 6/2015 | Roh | H01Q 7/00 235/439 |

FOREIGN PATENT DOCUMENTS

| | | |
|---|---|---|
| JP | 2011-259386 A | 12/2011 |
| KR | 10-0894054 B1 | 4/2009 |

(Continued)

*Primary Examiner* — Golam Sorowar
(74) *Attorney, Agent, or Firm* — Sughrue Mion, PLLC

(57) ABSTRACT

A tag detector of a near field communication (NFC) device includes a current monitor configured to monitor a current flowing in a regulator in a preset phase and a detection phase to generate a first sensing current and a second sensing current, respectively, a current to voltage converter configured to convert the first sensing current and the second sensing current to a first sensing voltage and a second sensing voltage, respectively, an analog to digital converter configured to convert the first sensing voltage and the second sensing voltage to a first digital code and a second digital code, respectively, and a decision circuit configured to compare the first digital code and the second digital code, and output a detection signal indicating that another NFC device is within a communication range of the NFC device, based on the comparison.

18 Claims, 19 Drawing Sheets

(52) U.S. Cl.
CPC ........... *H04W 52/04* (2013.01); *H04B 5/0075* (2013.01); *H04W 88/02* (2013.01)

(58) Field of Classification Search
CPC ................ H04B 5/0068; H04B 5/0081; G06K 19/0715; G06K 7/10237; G06K 19/0723; G06K 19/0701; G06K 19/07773; G06K 7/0008; H02J 7/025; H02J 17/00; H02J 2007/0001; H02J 50/12; H02J 5/005; H02J 7/007; H04W 4/008; H04W 4/046; H04W 52/04; H04W 52/243; H04W 52/245; H04W 52/28; H04W 52/383; H04W 72/0453; H04W 76/021; H04W 84/12; H04W 88/02
See application file for complete search history.

(56) References Cited

FOREIGN PATENT DOCUMENTS

| | | | |
|---|---|---|---|
| KR | 10-0920728 | B1 | 10/2009 |
| KR | 10-2011-0064690 | A | 6/2011 |
| KR | 10-1385638 | B1 | 4/2014 |

\* cited by examiner

TAG DETECTOR OF NEAR FIELD COMMUNICATION (NFC) DEVICE, NFC DEVICE AND MOBILE DEVICE INCLUDING THE SAME

CROSS-REFERENCE TO RELATED APPLICATION

This application claims priority from Korean Patent Application No. 10-2015-0129462, filed on Sep. 14, 2015, in the Korean Intellectual Property Office (KIPO), the disclosure of which is herein incorporated by reference in its entirety.

BACKGROUND

1. Field

Apparatuses consistent with example embodiments relate to near field communication (NFC), and more particularly, to a tag detector of an NFC device, the NFC device and a mobile device including the same.

2. Description of the Related Art

NFC technology is a type of wireless communication technology. Recent developments in NFC technology have resulted in NFC devices being used extensively in mobile devices.

When NFC devices operate in a reader mode, NFC devices may detect an NFC tag around the NFC devices to operate in a normal mode. Circuit complexity and power consumption may be important in performance of NFC devices.

SUMMARY

Example embodiments provide a tag detector of an NFC device, the tag detector being capable of enhancing performance and reducing power consumption.

Example embodiments provide the NFC device including the tag detector.

Example embodiments provide a mobile device including the NFC device.

According to example embodiments, a tag detector of an NFC device includes a current monitor configured to monitor a current flowing in a regulator in a preset phase and a detection phase to generate a first sensing current and a second sensing current, respectively, the regulator outputting, to a transmitter of the NFC device, a transmission power supply voltage, a current to voltage converter configured to convert the first sensing current and the second sensing current to a first sensing voltage and a second sensing voltage, respectively, an analog to digital converter configured to convert the first sensing voltage and the second sensing voltage to a first digital code and a second digital code, respectively, and a decision circuit configured to compare the first digital code and the second digital code, and output a detection signal indicating that another NFC device is within a communication range of the NFC device, based on the comparison.

The current monitor may include a first current generator connected between a first power supply voltage and a first node, connected to the regulator, and configured to generate a first current that is substantially equal to the current flowing in the regulator, a reference current generator connected between a second power supply voltage and a second node, and configured to generate a reference current, a second current generator connected between the first node, the second node, and a ground voltage, and configured to generate a second current that is N times greater than the reference current, N being a positive real number, a third current generator connected between the first node, a third node, and the ground voltage, and configured to generate a third current based on a difference between the first current and the second current, and a fourth current generator connected between the second power supply voltage, the third node, and an output node, and configured to generate a sensing current that is two times greater than the third current. A level of the first power supply voltage may be greater than a level of the second power supply voltage.

The first current generator may include a first p-channel metal-oxide semiconductor (PMOS) transistor including a source connected to the first power supply voltage, and a gate connected to an output terminal of an operational amplifier of the regulator, and a second PMOS transistor including a source connected to a drain of the first PMOS transistor, a gate configured to receive a regulator control signal, and a drain connected to the first node, the regulator control signal being input to the regulator. The first current may flow from the first power supply voltage to the first node.

The reference current generator may include a first p-channel metal-oxide semiconductor (PMOS) transistor including a source connected to the second power supply voltage, and a gate configured to receive a first bias signal, and a second PMOS transistor including a source connected to a drain of the first PMOS transistor, a gate configured to receive a second bias signal, and a drain connected to the second node. The reference current may flow from the second power supply voltage to the second node.

The second current generator may include a first n-channel metal-oxide semiconductor (NMOS) transistor including a drain connected to the first node, a second NMOS transistor including a drain connected to a source of the first NMOS transistor, and a source connected to the ground voltage, a third NMOS transistor including a drain connected to the second node, and a gate connected to a gate of the first NMOS transistor, and a fourth NMOS transistor including a drain connected to a source of the third NMOS transistor, a source connected to the ground voltage, and a gate connected to a gate of the second NMOS transistor and to the second node. The second current may flow from the first node to the ground voltage through the first NMOS transistor and the second NMOS transistor.

The third current generator may include a first n-channel metal-oxide semiconductor (NMOS) transistor including a drain connected to the first node, a second NMOS transistor including a drain connected to a source of the first NMOS transistor, and a source connected to the ground voltage, a third NMOS transistor including a drain connected to the third node, and a gate connected to a gate of the first NMOS transistor, and a fourth NMOS transistor including a drain connected to a source of the third NMOS transistor, a source connected to the ground voltage, and a gate connected to a gate of the second NMOS transistor and to the first node. The third current may flow from the first node to the ground voltage through the first NMOS transistor and the second NMOS transistor.

The fourth current generator may include a first p-channel metal-oxide semiconductor (PMOS) transistor including a source connected to the second power supply voltage, a second PMOS transistor including a source connected to a drain of the first PMOS transistor, and a drain connected to the third node, a third PMOS transistor including a source connected to the second power supply voltage, and a gate connected to a gate of the first PMOS transistor and to the third node, and a fourth PMOS transistor including a source connected to a drain of the third PMOS transistor, a drain connected to the output node, and a gate connected to a gate of the second PMOS transistor. The sensing current may flow from the second power supply voltage to the output node through the third PMOS transistor and the fourth PMOS transistor.

The current to voltage converter may include resistors connected in series between an input node to which the first sensing current and the second sensing current are input and a final node, first n-channel metal-oxide semiconductor (NMOS) transistors connected to one or more connection nodes between the resistors and to the final node, respectively, and second NMOS transistors connected between the first NMOS transistors and an output node at which the first sensing voltage and the second sensing voltage are output.

Each gate of the first NMOS transistors may be configured to receive a corresponding bit of a resistor selection signal, and each gate of the second NMOS transistors may be configured to receive a corresponding bit of a resistor enable signal.

The decision circuit may include a register configured to store the first digital code in the preset phase, and a digital comparator configured to compare the stored first digital code and the second digital code, and output the detection signal based on the comparison of the stored first digital code and the second digital code.

The decision circuit may be further configured to output the decision signal in response to the second digital code being greater than the first digital code.

According to example embodiments, a near field communication (NFC) device includes a resonator configured to transmit and receive data to and from another NFC device through an electromagnetic wave, and an NFC chip configured to transmit output data to the resonator, and receive input data from the resonator. The NFC chip includes a transmitter connected to the resonator through a first transmission terminal and a second transmission terminal, a regulator configured to output a transmission power supply voltage to the transmitter, a tag detector configured to generate a first sensing current and a second sensing current flowing in the regulator in a preset phase and a detection phase, respectively, in response to the electromagnetic wave being radiated, compare the first sensing current and the second sensing current, and output a detection signal indicating that the other NFC device is within a communication range of the NFC device based on the comparison, and a processor configured to change an operation mode of the NFC device from a stand-by mode to an active mode based on the detection signal.

The transmitter may include a first driver including a first pull-up transistor connected between the transmission power supply voltage and the first transmission terminal, and a first pull-down transistor connected between the first transmission terminal and a ground voltage, a second driver including a second pull-up transistor connected between the transmission power supply voltage and the second transmission terminal, and a second pull-down transistor connected between the second transmission terminal and the ground voltage, and a controller configured to output driving signals to the first driver and the second driver based on a control signal from the processor.

The regulator may be further configured to gradually increase a current flowing through the first driver, the resonator, and the second driver in the preset phase in which the other NFC device is out of the communication range of the NFC device, and the tag detector may be further configured to generate the first sensing current based on an average of the increased current.

The regulator may include an operational amplifier configured to compare a reference voltage and a feedback voltage, a current generator including a first p-channel metal-oxide semiconductor (PMOS) transistor and a second PMOS transistor that are connected in series between a first power supply voltage and a first output node at which the transmission power supply voltage is output, the current generator being configured to generate a regulator current having a magnitude based on a regulator control signal, and a feedback circuit including a first resistor and a second resistor that are connected in series between the first output node and a ground voltage, the feedback circuit being configured to output the feedback voltage at a feedback node to which the first resistor and the second resistor are connected.

The first PMOS transistor may include a gate connected to an output terminal of the operational amplifier, and the second PMOS transistor may include a gate configured to receive the regulator control signal.

The tag detector may include a current monitor connected to an output terminal of the regulator, configured to receive the regulator control signal, and configured to monitor the regulator current in the preset phase and the detection phase to generate the first sensing current and the second sensing current, respectively, a current to voltage converter configured to convert the first sensing current and the second sensing current to a first sensing voltage and a second sensing voltage, respectively, an analog to digital converter configured to convert the first sensing voltage and the second voltage current to a first digital code and a second digital code, respectively, and a decision circuit configured to compare the first digital code and the second digital code, and output the detection signal based on the comparison.

The transmitter may include a first driver including first pull-up transistors connected in parallel between the transmission power supply voltage and the first transmission terminal, and first pull-down transistors connected in parallel between the first transmission terminal and a ground voltage, a second driver including second pull-up transistors connected in parallel between the transmission power supply voltage and the second transmission terminal, and second pull-down transistors connected in parallel between the second transmission terminal and the ground voltage, and a controller configured to output driving signals to the first driver and the second driver based on a control signal from the processor.

According to example embodiments, a mobile device includes a battery cover on which a first coil and a second coil are disposed, a resonator connected to the first coil, and configured to transmit and receive data to and from a near field communication (NFC) device through an electromagnetic wave, an NFC chip connected to the resonator, a communication processor connected to the NFC chip, a wireless charging control circuit connected to the second coil, and configured to control wireless charging, and a charging circuit connected to the wireless charging control circuit, and configured to charge a battery with the wireless charging. The NFC chip includes a transmitter connected to the resonator through a first transmission terminal and a second transmission terminal, a regulator configured to output a transmission power supply voltage to the transmitter, a tag detector configured to generate a first sensing current and a second sensing current flowing in the regulator in a preset phase and a detection phase, respectively, in response to the electromagnetic wave being radiated, compare the first sensing current and the second sensing current, and output a detection signal indicating that the NFC device is within a communication range of the mobile device based on the comparison, and a processor configured to change an operation mode of the NFC device from a stand-by mode to an active mode based on the detection signal.

The mobile device may include a smartphone.

According to example embodiments, a near field communication (NFC) device includes a resonator configured to transmit and receive data to and from another NFC device, a transmitter configured to transmit a transmission signal to the resonator, a regulator configured to output a transmission power supply voltage to the transmitter, and a tag detector configured to detect an increase of a current flowing in the regulator in response to the transmitter transmitting the transmission signal, and output a detection signal indicating that the other NFC device is within a communication range of the NFC device, in response to the tag detector detecting the increase of the current flowing in the regulator.

The NFC device may further include a rectifier configured to receive, from the resonator, a first voltage that is induced by an electromagnetic wave, and rectify the first voltage to generate a second voltage, another regulator configured to generate an internal voltage based on the second voltage, and a processor configured to change an operation mode of the NFC device from a stand-by mode to an active mode based on the detection signal, and operate based on the internal voltage.

The other regulator may include a series regulator configured to receive the second voltage, and a shunt regulator connected between an output terminal of the series regulator and a ground voltage. The series regulator and the shunt regulator may be configured to generate the internal voltage based on the second voltage.

BRIEF DESCRIPTION OF THE DRAWINGS

The above and/or other aspects will be more apparent by describing example embodiments with reference to the accompanying drawings.

DETAILED DESCRIPTION

Figure 1:
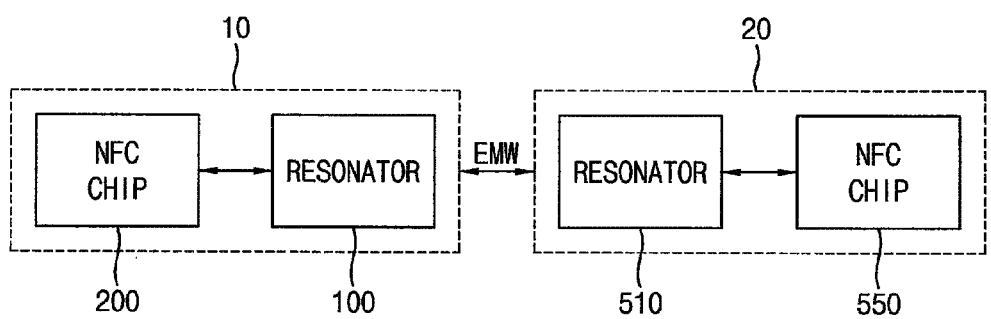
FIG. 1 is a block diagram illustrating a near field communication (NFC) system according to example embodiments.

Example embodiments will be described more fully with reference to the accompanying drawings, in the example embodiments are shown. The example embodiments may, however, be embodied in many different forms and may not be construed as limited to the example embodiments set forth herein. Rather, these example embodiments are provided so that this disclosure will be thorough and complete, and will fully convey the scope of the example embodiments to those skilled in the art. Like reference numerals refer to like elements throughout this application.

It will be understood that, although the terms first, second, etc. may be used herein to describe various elements, these elements may not be limited by these terms. These terms are used to distinguish one element from another. For example, a first element could be termed a second element, and, similarly, a second element could be termed a first element, without departing from the scope of the example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements may be interpreted in a like fashion (e.g., "between" versus "directly between," "adjacent" versus "directly adjacent," etc.).

The terminology used herein is for the purpose of describing the example embodiments and is not intended to be limiting of the example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which the example embodiments belong. It will be further understood that terms, such as those defined in commonly used dictionaries, may be interpreted as having a meaning that is consistent with their meaning in the context of the relevant art and will not be interpreted in an idealized or overly formal sense unless expressly so defined herein.

FIG. 1 is a block diagram illustrating a near field communication (NFC) system according to example embodiments.

In an NFC system 5 of FIG. 1, NFC devices 10 and 20 communicate with each other based on an NFC scheme. In a card mode, in which the NFC device 10 operates as a card, the NFC device 10 may transceive data with an NFC device 20 (or NFC reader) based on an electromagnetic wave (EMW) provided from an NFC reader. In a reader mode, in which the NFC device 10 operates as a reader, the NFC device 10 may transceive data with the NFC device 20 based on an EMW provided from the NFC device 10.

Referring to FIG. 1, the NFC system 5 includes the NFC devices 10 and 20. The NFC device 10 includes a resonator 100 and an NFC chip 200. The NFC device 20 includes a resonator 510 and an NFC chip 550.

During reception operation, the resonator 100 receives an input message from the NFC device 20 based on the EMW, and the NFC chip 200 receives the input message from the resonance circuit 100. During transmission operation, the NFC chip 200 provides an output message to the resonator 100, and the resonator 100 transmits the output message to the NFC device 20 through the EMW.

In the card mode, the resonator 100 provides a signal, which is induced in response to the EMW received from the NFC device 20, to the NFC chip 200, and the NFC chip 200 performs the signal reception operation by generating the input message by demodulating the signal. In the card mode for a signal transmit operation, the NFC chip 200 provides a modulation signal, which is generated by modulating the output data, to the resonator 100, and the resonator 100 may perform the signal transmission operation by reflecting the EMW received from the NFC device 20 based on the modulation signal.

In the reader mode, the NFC chip 200 may provide a transmission signal as part of a signal transmission operation, which is obtained by synthesizing the modulation signal generated by modulating the output message with a carrier signal, to the resonator 100, and the resonator 100 provides the transmit signal in the form of the EMW to the NFC device 20 to perform the signal transmission operation. In the reader mode, the NFC chip 200 may provide a signal as part of a signal receive operation, which is induced in response to the EMW reflected from the NFC device 20, and the NFC chip 200 generates the input message by demodulating the signal to perform the signal reception operation.

The NFC chip 200 may reduce communication errors during the signal transmission operation by adaptively changing a radio frequency (RF) parameter associated with signal transmission operation during the signal transmission operation in the card mode. In addition, The NFC chip 200 may reduce communication errors during the signal reception operation by adaptively changing a RF parameter associated with the signal reception operation during the signal reception operation in the card mode.

NFC is a contactless short-range wireless communication standard between electronic devices within a short distance of 10 cm with low power consumption by using a frequency of 13.56 MHz. A data transfer rate of an NFC system is 424 Kbps, and an NFC system has excellent security due to high proximity and encryption technology. NFC forgoes a complicated pairing process for recognition of devices but allows devices to recognize one another within 1/10 second or less. NFC is a smart card type contactless wireless communication technology in which radio frequency identification (RFID) technology is utilized. In addition, NFC builds upon RFID technology by allowing two-way communication, as compared to smart cards, which has only one-way communication, and has a relatively large memory storage space and offers more variety of services.

In detail, NFC is a wireless communication method in which data is directly exchanged between terminals, for example, between the NFC device 10 and the NFC device 20, without using a communication network, and is a type of RFID method. A wireless communication method using RFID may be classified according to frequencies used. For example, RFID at 13.56 MHz is mainly used for smart cards, such as transit cards or entrance cards, and RFID at 900 MHz is used mainly for logistics. NFC corresponds to RFID that, like smartcards, uses a frequency of 13.56 MHz. However, unlike smartcards, which allow only one-way communication, NFC allows two-way communication. Accordingly, NFC is different from smart cards, which function as a tag that stores information and transmits the same to a reader. NFC communication allows a tag function according to necessity but also supports a function of recording information on the tag, and may be used in peer to peer (P2P) data exchange between terminals in which NFC is set.

Figure 2:
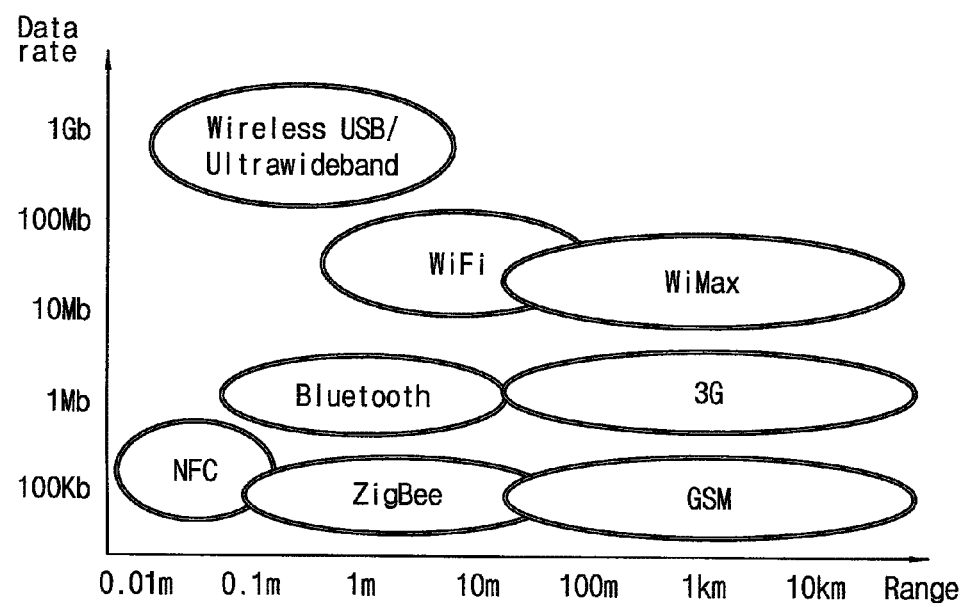
FIG. 2 is a graph comparing data rates and communication ranges of NFC and other wireless communication methods.

NFC that is developed based on RFID may be compared with other wireless communication methods, such as WiFi, Bluetooth, ZigBee, etc., as shown in FIG. 2.

FIG. 2 is a graph comparing data rates and communication ranges of NFC and other wireless communication methods.

Referring to FIG. 2, compared to other wireless communication methods, NFC may operate at a distance within about 10 cm. Unlike Bluetooth or WiFi etc., which allow communication in about several to several tens of meters, NFC allows communication only within an extremely short distance (about 10 cm).

In addition, NFC may be compared to other wireless communication methods, such as Bluetooth, ZigBee, etc., as shown in Table 1 below.

TABLE 1

| Technology | Frequency used | Security | Standard range | Major service area |
|---|---|---|---|---|
| NFC | 13.56 MHz | Encryption is applied | International Standard | Contactless payment, RFID, file transmission |
| Bluetooth | 2.4 GHz | N/A | International Standard | File transmission |
| ZigBee | 2.4 GHz | N/A | International Standard | Device control, RFID |
| 900 MHz RFID | 900 MHz | N/A | Korean Standard | RFID |

In other words, compared to other wireless communication methods, NFC operates only within a distance of 10 cm, encryption technology is applied thereto, and thus, a security level of NFC is high. Accordingly, when used in combination with other high-speed wireless communication methods, such as 3G or WiFi, communication between devices via NFC may be performed with a higher efficiency and security. For example, when NFC and Bluetooth technology are combined, NFC may be used in connecting terminals (authorization), and Bluetooth may be used in data transmission between the terminals to thereby enable more efficient communication between the devices.

Figure 3:
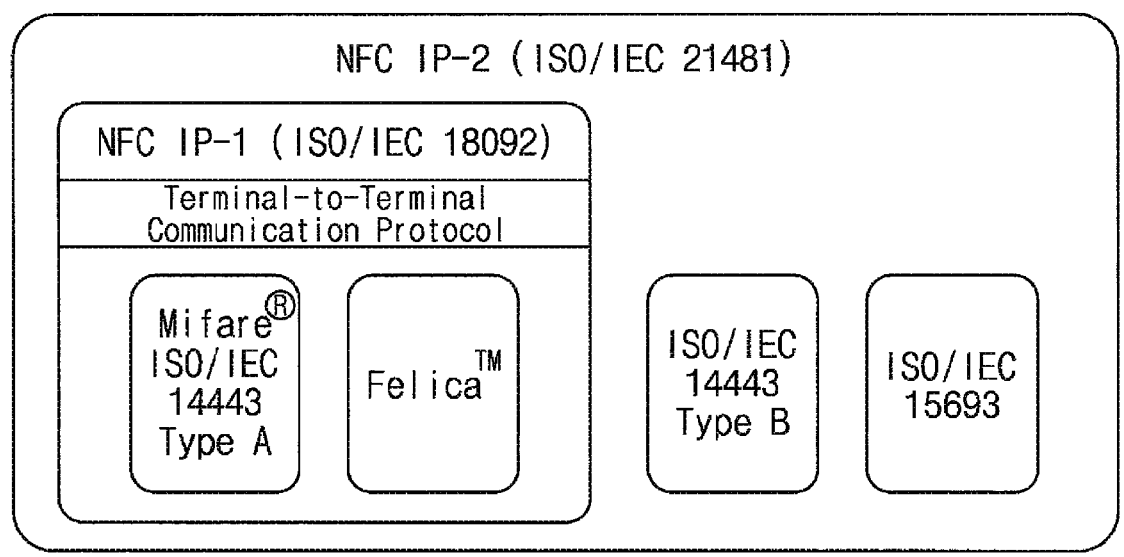
FIG. 3 is a diagram illustrating standards related to NFC technology.

FIG. 3 is a diagram illustrating standards related to NFC technology.

Referring to FIG. 3, NFC standard technology follows International Organization for Standardization (ISO) and is also an extension of ISO 14443 Proximity-card Standard, and here, the inclusion relation of NFC IP-1 (NFC Interface Protocol-1)(ISO/IEC 18092) and NFC IP-2 (ISO/IEC 21481) is illustrated. Here, ISO/IEC 14443 Type A and Type B, FeliCa, and ISO/IEC 15693 are international standards of four areas of contactless cards operating at 13.56 MHz. Also, ISO/IEC 18092 defines communication modes for NFC interface and protocol.

Figure 4:
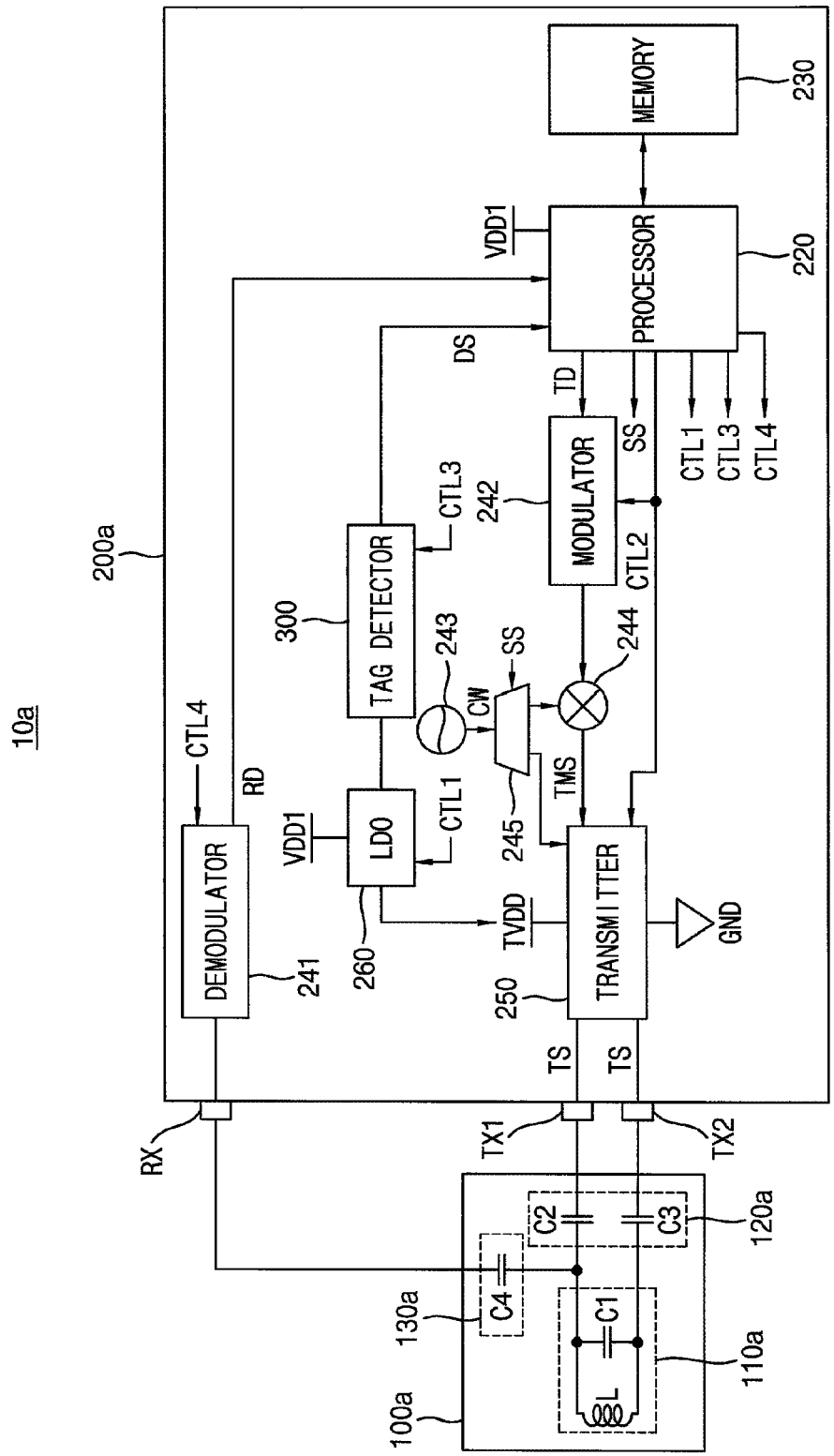
FIG. 4 is a block diagram illustrating an NFC device according to example embodiments.

FIG. 4 is a block diagram illustrating an NFC device according to example embodiments.

Only elements to operate an NFC device 10a in the reader mode are illustrated in FIG. 4, and elements to operate the NFC device 10a in the card mode are omitted in FIG. 4.

Referring to FIG. 4, the NFC device 10a includes a resonator 100a and an NFC chip 200a. The NFC chip 200a is connected to the resonator 100 through a first transmission terminal TX1, a second transmission terminal TX2 and a reception terminal RX.

The resonator 100a includes a resonance circuit 110a including an antenna L and a first capacitor C1. The resonator 100a further includes a matching circuit 120a connected to the resonance circuit 110a, the first transmission terminal TX1, and the second transmission terminal TX2, and including a second capacitor C2 and a third capacitor C3 to perform an impedance matching. The resonator 100a further includes a filter 130a connected to the resonance circuit 110a and the reception terminal RX, and including a fourth capacitor C4.

The configuration of the resonator 100a illustrated in FIG. 4 is an example only, and the configuration of the resonator 100a according to example embodiments may not be limited to the above, but may be variously modified.

The NFC chip 200a may perform transmission operation through the first and second transmission terminals TX1 and TX1 in an active mode and may perform reception operation through the reception terminal RX in the active mode.

The NFC chip 200a includes a processor 220, a memory 230, a demodulator 241, an oscillator 243, a mixer 244, a demultiplexer 245, a transmitter 250, a regulator 260, and a tag detector 300.

The processor 220 may control the overall operation of the NFC chip 200a. The processor 220 may operate by receiving a first power supply voltage VDD1 from a power source, such as a battery.

When the signal reception operation is performed in the active mode, the demodulator 241 generates reception date RD by demodulating the signal supplied from the resonator 100 through the reception terminal RX to provide the reception data RD to the processor 220. The processor 220 may store the reception data RD in the memory 230.

When the signal transmission operation is performed in the active mode, the processor 220 reads out transmission data TD from the memory 230 to provide the transmission data TD to the modulator 242, and the modulator 242 modulates the transmission data TD to provide a modulation signal. In addition, the oscillator 243 generates a carrier signal CW having a frequency corresponding to a carrier frequency (for example, 13.56 MHz), the demultiplexer 245 may provide the carrier signal CW to the mixer 244 in response to a selection signal SS, and the mixer 244 may combine the carrier signal CW with the modulated signal to generate a transmission modulation signal TMS.

In each of a preset phase and a detection phase of a stand-by mode, the demultiplexer 245 may provide the carrier signal CW to the transmitter 250 in response to the selection signal SS from the processor 220, and the transmitter 250 may generate a transmission signal TS based on the carrier signal CW to perform a detection operation for detecting the NFC device 20.

The transmitter 250 is connected between a transmission power supply voltage TVDD and a ground voltage GND.

The transmitter 250 may receive the carrier signal CW from the demultiplexer 245 in the stand-by mode and generate the transmission signal TS corresponding to the carrier signal CW. In addition, the transmitter 250 may receive the transmission modulation signal TMS from the mixer 244 in the active mode, and the resonator 100a may generate the electromagnetic wave EMW corresponding to the transmission signal TS provided from the transmitter 250 through the first and second transmission terminals TX1 and TX2. For example, the transmitter 250 may allow the first and second transmit terminals TX1 and TX2 to be connected to either the transmission power supply voltage TVDD through a pull-up load or the ground voltage GND through pull-down load based on the transmission modulation signal TMS in the active mode, so that the transmission signal TS may be provided to the resonator 102a through the first and second transmit terminals TX1 and TX2.

The processor 220 may provide the transmitter 250 with a control signal CTL2 having a plurality of bits indicating a mode and operation of the NFC device 10a based on the mode and the operation of the NFC device 10a. In addition, the processor 220 may control operation of the demodulator 241 by providing a control signal CTL4 to the demodulator 241.

The regulator 260 is connected to the first power supply voltage VDD1 and may provide the transmission power supply voltage TVDD to the transmitter 250. The regulator 260 is implemented with a low drop-out (LDO) regulator and may adjust a level of the transmission power supply voltage TVDD in response to a control signal CTL1 from the processor 220.

The tag detector 300 is connected to the regulator 260, may monitor a current (regulator current) flowing in the regulator 260 when the electromagnetic wave EMW is radiated through the resonator 100a respectively in a preset phase and a detection phase, and may determine whether an NFC tag (i.e., the NFC device 20) is within a communication range of the NFC device 10a based on a comparison of a first sensing current in the preset phase and a second sensing current in the detection phase.

The tag detector 300 may determine whether the NFC device 20 is within a communication range of the NFC device 10a and may output a detection signal DS to the processor 220, which indicates whether the NFC device 20 is within a communication range of the NFC device 10a. The processor 220 may receive the detection signal DS and may determine an operation mode of the NFC device 10a based on a logic level of the detection signal DS.

When the NFC device 20 is out of the communication range of the NFC device 10a and the detection signal DS has a first logic level (logic low level), the processor 220 may maintain the operation mode of the NFC device 10a as the stand-by mode. When the NFC device 20 is within the communication range of the NFC device 10a and the detection signal DS has a second logic level (logic high level), the processor 220 may change the operation mode of the NFC device 10a from the stand-by mode to the active mode.

In the active mode, the processor 220 provides a control signal CTL2 to enable the modulator 242 and transmits a request command through the transmitter 250. The processor 220 provides the control signal CTL4 to enable the demodulator 241, and the demodulator 241 may await a response in response to the request command from the NFC device 20 during a predetermined time interval. When the response is received in response to the request command during the predetermined time interval, the NFC device 10 initiates data transmission/reception with the NFC device 20. When the response is not received in response to the request command during the predetermined time interval, the processor 220 provides the control signals CTL2 and CTL4 to disable the modulator 242 and the demodulator 241, respectively, and provides the control signals CTL1 and CTL3 to the regulator 260 and the tag detector 300, respectively, to perform above-described detection operation.

Figure 5:
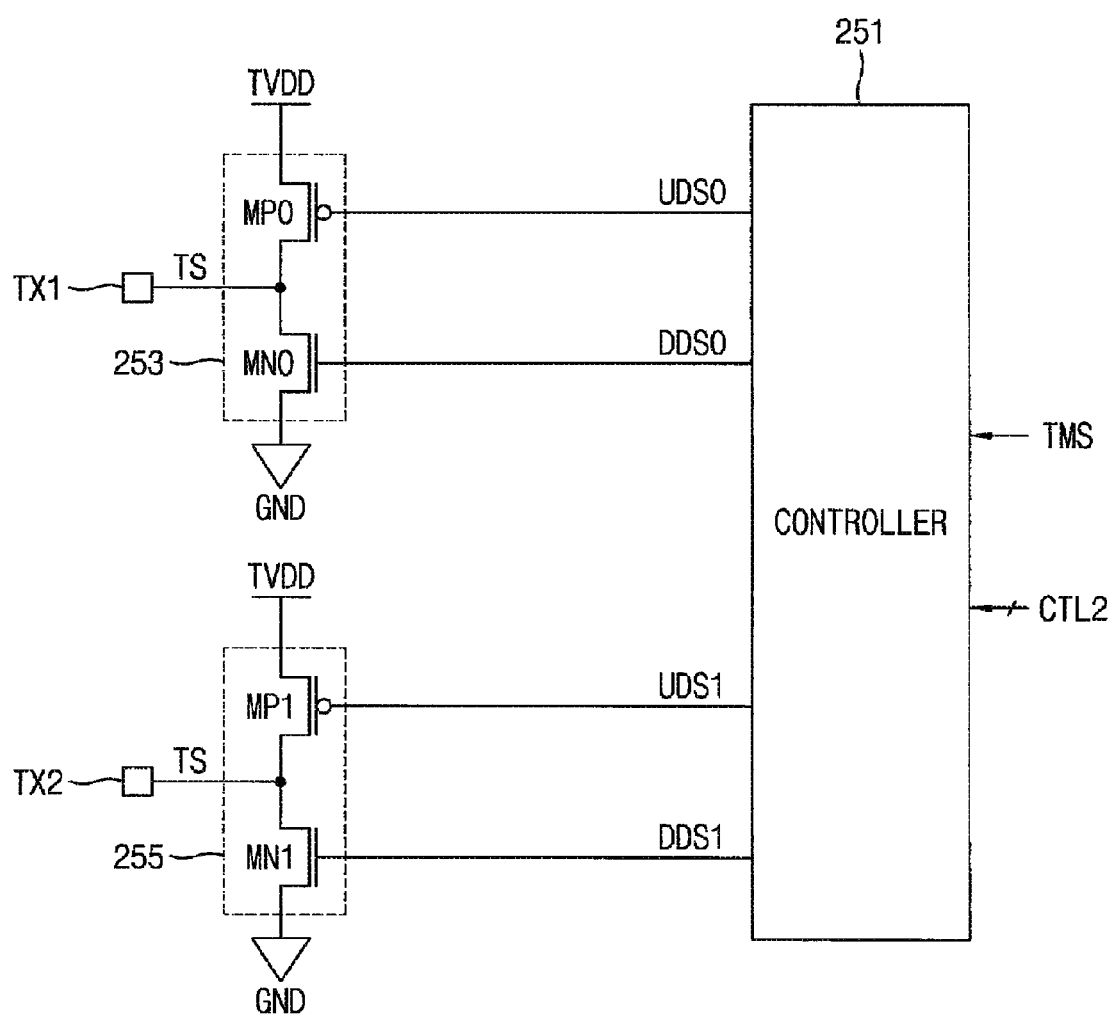
FIG. 5 is a block diagram illustrating a transmitter in an NFC device, according to example embodiments.

FIG. 5 is a block diagram illustrating a transmitter in an NFC device, according to example embodiments.

Referring to FIG. 4, a transmitter 250a includes a first driver 253, a second driver 255, and a controller 251. The first driver 253 includes a first pull-up transistor MP0 and a first pull-down transistor MN0, and the second driver 255 includes a second pull-up transistor MP1 and a second pull-down transistor MN1.

The first pull-up transistor MP0 and the second pull-up transistor MP1 may be p-channel metal oxide semiconductor (PMOS) transistors, and the first pull-down transistor MN0 and the second pull-down transistor MN1 may be n-channel metal oxide semiconductor (NMOS) transistors.

The first pull-up transistor MP0 is connected between the transmission supply voltage TVDD and the first transmission terminal TX1, and the first pull-down transistor MN0 is connected between the first transmission terminal TX1 and the ground voltage GND.

The second pull-up transistor MP1 is connected between the transmission supply voltage TVDD and the second transmission terminal TX2, and the second pull-down transistor MN1 is connected between the second transmission terminal TX2 and the ground voltage GND.

The controller 251 may drive the first pull-up transistor MP0 through a first pull-up driving signal UDS0, may drive the first pull-down transistor MN0 through a first pull-down driving signal DDS0, may drive the second pull-up transistor MP1 through a second pull-up driving signal UDS1, and may drive the second pull-down transistor MN1 through a second pull-down driving signal DDS1.

The controller 251 may determine whether the NFC chip 200a is in the stand-by mode or the active mode based on the control signal CTL2 supplied from the processor 220. In addition, the controller 251 may determine whether to change the Q factor of the resonator 100b based on the control signal CTL2 supplied from the processor 240.

In the stand-by mode, the controller 251 may pull up the first driver 253 and pull down the second driver 255 based on the control signal CTL2 such that current from the transmission power supply voltage TVDD flows to the ground voltage GND through the first pull-up transistor MP0, the first transmission terminal TX1, the resonator 100a, the second transmission terminal TX2, and the second pull-down transistor MN1, and the tag detector 300 may monitor the first sensing current and the second sensing current.

The controller 251 may selectively turn on one among the first pull-up transistor MP0 and the first pull-down transistor MN0 and one among the second pull-up transistor MP1 and the second pull-down transistor MN1 based on the transmission modulation signal TMS in the active mode. The transmitter 250a drives the first pull-up transistor MP0, the second pull-up transistor MP1, the first pull-down transistor MN0 and the second pull-down transistor MN1 based on the transmission modulation signal TMS in the active mode to perform the transmission operation to provide the transmission modulation signal TMS to the resonator 100a.

Figure 6:
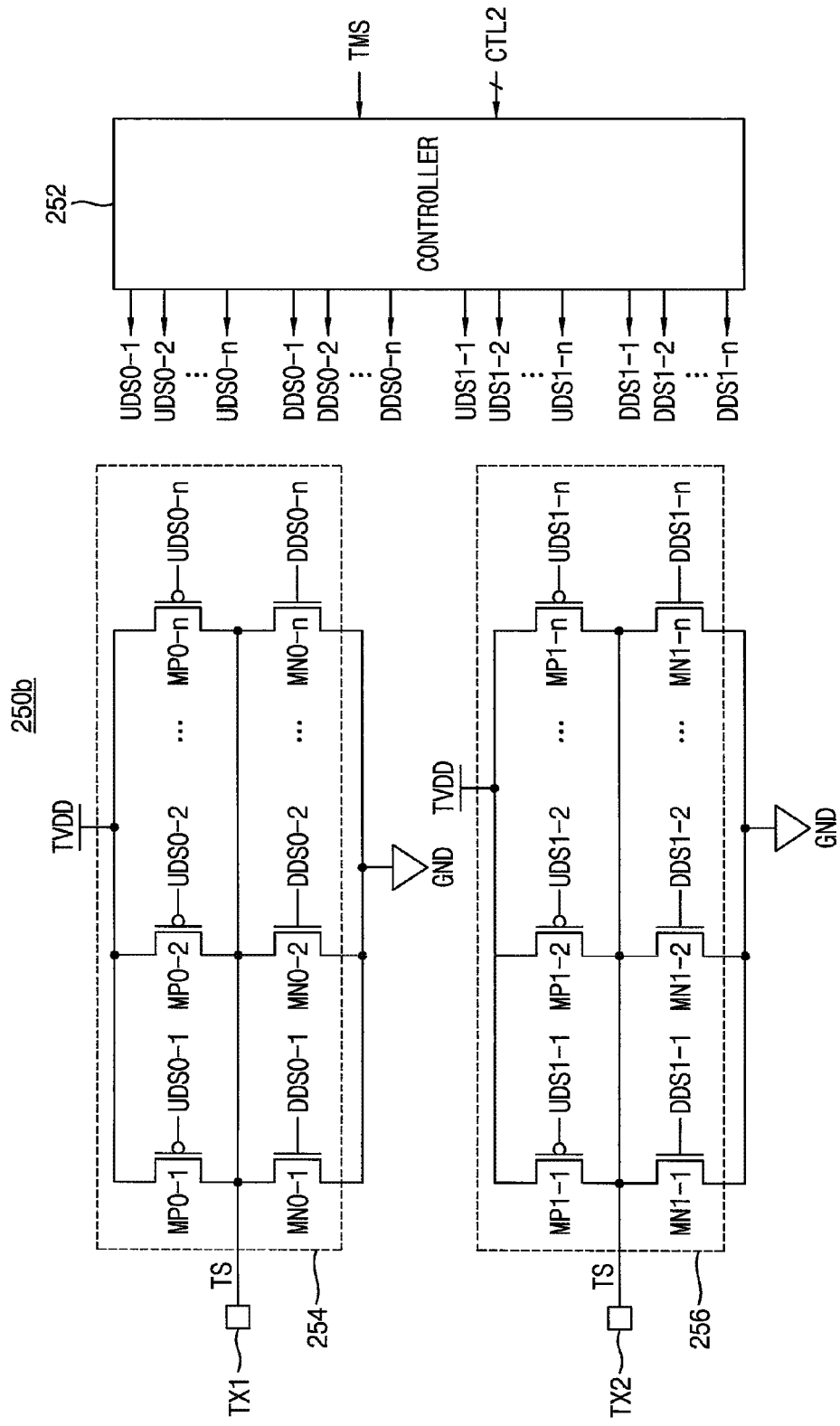
FIG. 6 is a block diagram illustrating a transmitter in an NFC device, according to other example embodiments.

FIG. 6 is a block diagram illustrating a transmitter in an NFC device, according to other example embodiments.

Referring to FIG. 6, a transmitter 250b includes a first driver 254, a second driver 256, and a controller 252. The first driver 254 includes $(1-1)^{th}$ to $(1-n)^{th}$ pull-up transistors MP0-1, MP0-2, . . . , and MP0-n and $(1-1)^{th}$ to $(1-n)^{th}$ pull-down transistors MN0-1, MN0-2, . . . , and MN0-n. The second driver 256 includes second-1 to second-n pull-up transistors MP1-1, MP1-2, . . . , and MP1-n and second-1 to second-n pull-down transistors MN1-1, MN1-2, . . . , and MN1-n.

The $(1-1)^{th}$ to $(1-n)^{th}$ pull-up transistors MP0-1, MP0-2, . . . , and MP0-n and the second-1 to second-n pull-up transistors MP1-1, MP1-2, . . . , and MP1-n may be PMOS transistors, and the $(1-1)^{th}$ to $(1-n)^{th}$ pull-down transistors MN0-1, MN0-2, . . . , and MN0-n and the second-1 to second-n pull-down transistors MN1-1, MN1-2, . . . , and MN1-n may be the NMOS transistors.

The $(1-1)^{th}$ to $(1-n)^{th}$ pull-up transistors MP0-1, MP0-2, . . . , and MP0-n may be connected in parallel between the transmission supply voltage TVDD and the first transmission terminal TX1, and the $(1-1)^{th}$ to $(1-n)^{th}$ pull-down transistors MN0-1, MN0-2, . . . , and MN0-n may be connected in parallel between the first transmission terminal TX1 and the ground voltage GND.

The second-n pull-up transistors MP1-1, MP1-2, . . . , and MP1-n may be connected in parallel between the transmission supply voltage TVDD and the second transmission terminal TX2, and the second-1 to second-n pull-down transistors MN1-1, MN1-2, . . . , and MN1-n may be connected in parallel between the second transmission terminal TX2 and the ground voltage GND.

The controller 252 may drive the $(1-1)^{th}$ to $(1-n)^{th}$ pull-up transistors MP0-1, MP0-2, . . . , and MP0-n through $(1-1)^{th}$ to $(1-n)^{th}$ pull-up driving signals UDS0-1, UDS0-2, . . . , and UDS0-n, respectively, drive the $(1-1)^{th}$ to $(1-n)^{th}$ pull-down transistors MN0-1, MN0-2, . . . , and MN0-n through $(1-1)^{th}$ to $(1-n)^{th}$ pull-down driving signals DDS0-1, DDS0-2, . . . , and DDS0-n, respectively, drive the second-n pull-up transistors MP1-1, MP1-2, . . . , and MP1-n through second-1 to second-n pull-up driving signals UDS1-1, UDS1-2, . . . , and UDS1-n, respectively, and drive the second-1 to second-n pull-down transistors MN1-1, MN1-2, . . . , and MN1-n through second-1 to second-n pull-down driving signals DDS1-1, DDS1-2, . . . , and DDS1-n, respectively.

The controller 252 may determine whether the NFC chip 200b is in the stand-by mode or the active mode based on the control signal CTL2 supplied from the processor 220.

In the stand-by mode, the controller 252 may selectively turn on the $(1-1)^{th}$ to $(1-n)^{th}$ pull-up transistors MP0-1, MP0-2, ..., and MP0-n, turn-off the $(1-1)^{th}$ to $(1-n)^{th}$ pull-down transistors MN0-1, MN0-2, ..., and MN0-n, turn-off the second-n pull-up transistors MP1-1, MP1-2, ..., and MP1-n and selectively turn-on the second-1 to second-n pull-down transistors MN1-1, MN1-2, ..., and MN1-n based on the control signal CTL2 such that current from the transmission power supply voltage TVDD flows to the ground voltage GND through some of the $(1-1)^{th}$ to $(1-n)^{th}$ pull-up transistors MP0-1, MP0-2, ..., and MP0-n, the first transmission terminal TX1, the resonator 100a, the second transmission terminal TX2 and some of the second-1 to second-n pull-down transistors MN1-1, MN1-2, ..., and MN1-n. The tag detector 300 may monitor the first sensing current and the second sensing current.

In the active mode, the controller 252 may turn-on the $(1-1)^{th}$ to $(1-n)^{th}$ pull-up transistors MP0-1, MP0-2, ..., and MP0-n, the $(1-1)^{th}$ to $(1-n)^{th}$ pull-down transistors MN0-1, MN0-2, ..., and MN0-n, the second-n pull-up transistors MP1-1, MP1-2, ..., and MP1-n or the second-1 to second-n pull-down transistors MN1-1, MN1-2, ..., and MN1-n based on the transmission modulation signal TMS.

In addition, the controller 525 may drive the $(1-1)^{th}$ to $(1-n)^{th}$ pull-up transistors MP0-1, MP0-2, ..., and MP0-n, the second-n pull-up transistors MP1-1, MP1-2, ..., and MP1-n, the $(1-1)^{th}$ to $(1-n)^{th}$ pull-down transistors MN0-1, MN0-2, ..., and MN0-n, and the second-1 to second-n pull-down transistors MN1-1, MN1-2, ..., and MN1-n based on the transmission modulation signal TMS in the active mode to perform the transmission operation to provide the transmission signal TS to the resonator 100a.

Figure 7:
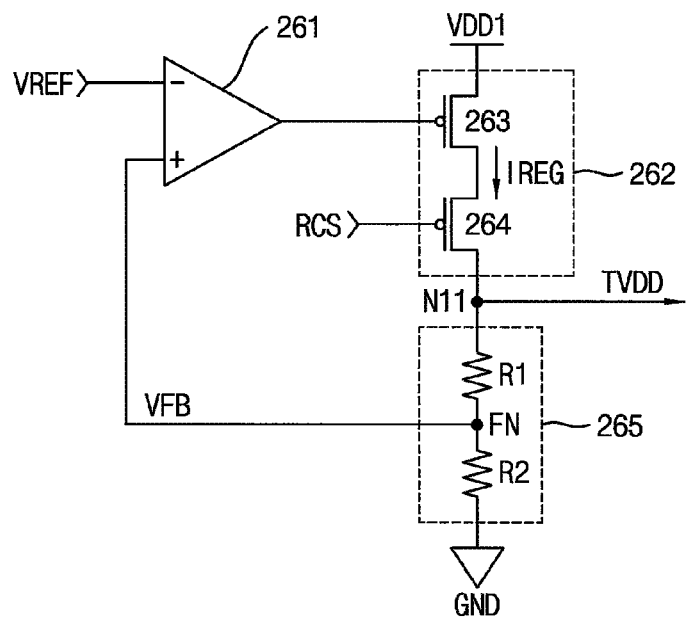
FIG. 7 is a circuit diagram illustrating a regulator in the NFC device of FIG. 4.

FIG. 7 is a circuit diagram illustrating the regulator in the NFC device of FIG. 4.

Referring to FIG. 7, the regulator 260 includes an operational amplifier 261, a current generator 262, and a feedback circuit 265.

The operational amplifier 261 includes a first (negative) input terminal receiving a reference voltage VREF, a second (positive) input terminal receiving a feedback voltage VFB, and an output terminal. The operational amplifier 261 compares the reference voltage VREF and the feedback voltage VFB to provide the current generator 262 with an output indicating a result of comparison of the reference voltage VREF and the feedback voltage VFB through the output terminal.

The current generator 262 includes a first PMOS transistor 263 and a second PMOS transistor 264 that are connected in series between the first power supply voltage VDD1 and an output node N11. The first PMOS transistor 263 includes a source connected to the first power supply voltage VDD1, and a gate connected to the output terminal of the operational amplifier 261. The second PMOS transistor 264 includes a source connected to a drain of the first PMOS transistor 263, a gate receiving a regulator control signal RCS, and a drain connected to the output node N11. The transmission power supply voltage TVDD that is applied to the transmitter 250 is output at the output node N11.

A regulator current REG flows from the first power supply voltage VDD1 to the output node N11 through the first and second PMOS transistors 263 and 264, and a magnitude of the regulator current IREG may be adjusted according to the regulator control signal RCS that may be included in the control signal CTL1.

The feedback circuit 265 includes a first resistor R1 and a second resistor R2 connected in series between the output node N11 and the ground voltage GND. The first and second resistors R1 and R2 are connected to each other at a feedback node FN, and the feedback voltage VFB is provided to the second input terminal of the operational amplifier 261. The transmission power supply voltage TVDD is voltage-divided to the feedback voltage VFB by the first and second resistors R1 and R2.

Figure 8:
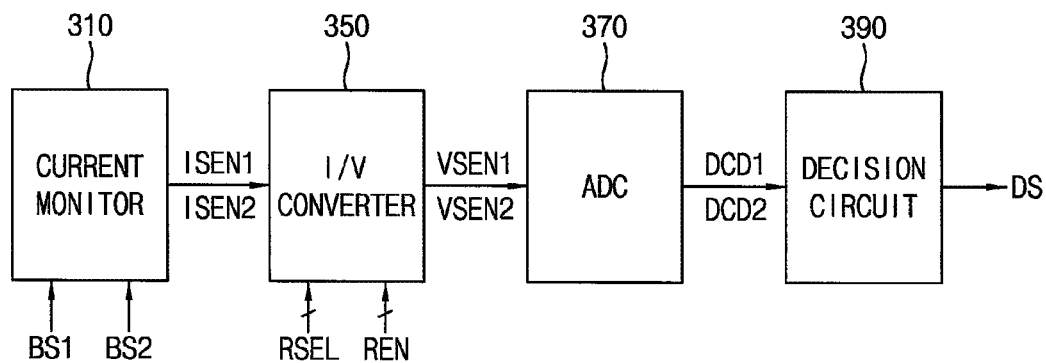
FIG. 8 is a block diagram illustrating a tag detector in the NFC device of FIG. 4.

FIG. 8 is a block diagram illustrating the tag detector in the NFC device of FIG. 4.

Referring to FIG. 8, the tag detector 300 includes a current monitor 310, a current to voltage (I/V) converter 350, an analog to digital converter (ADC) 370, and a decision circuit 390.

The current monitor 310 is connected to the output terminal of the operational amplifier 261 and generates a first sensing current ISEN1 and a second sensing current ISEN2 by monitoring the regulator current IREG flowing in the regulator 260 respectively in the preset phase and in the detection phase. The current monitor 310 generates the first sensing current ISEN1 and the second sensing current ISEN2 respectively in the preset phase and in the detection phase by receiving a first bias signal BS1 and a second bias signal BS2.

The I/V converter 350 converts the first sensing current ISEN1 and the second sensing current ISEN2 to a first sensing voltage VSEN1 and a second sensing voltage VSEN2, respectively, in the preset phase and in the detection phase, based on a resistor selection signal RSEL and a resistor enable signal REN.

The ADC 370 converts the first sensing voltage VSEN1 and the second sensing voltage to a first digital code DCD1 and a second digital code DCD2, respectively, in the preset phase and in the detection phase.

The decision circuit 390 outputs the detection signal DS to the processor 220, which indicates that the NFC device 20 is within a communication range of the NFC device 10a, based on a comparison of the first digital code DCD1 and the second digital code DCD2.

Figure 9:
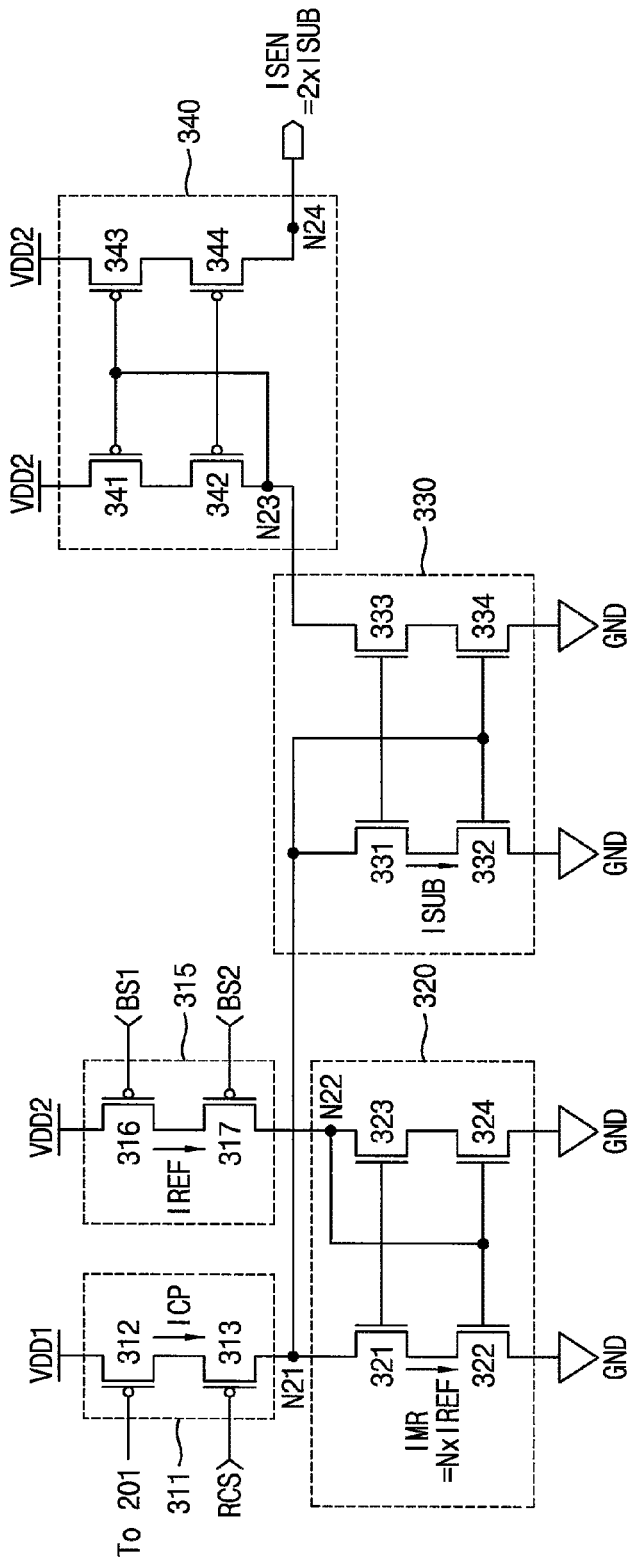
FIG. 9 is a circuit diagram illustrating a current monitor in the tag detector of FIG. 8.

FIG. 9 is a circuit diagram illustrating the current monitor in the tag detector of FIG. 8.

Referring to FIG. 9, the current monitor 310 includes a first current generator 311, a reference current generator 315, a second current generator 320, a third current generator 330, and a fourth current generator 340.

The first current generator 311 is connected between the first power supply voltage VDD1 and a first node N21, is to the output terminal of the regulator 260, and generates a first current ICP that is substantially the same as the regulator current IREG.

The reference current generator 315 is connected between a second power supply voltage VDD2 and a second node N22, and generates a reference current IREF.

The second current generator 320 is connected between the first node N21, the second node N22, and the ground voltage GND, and generates a second current IMR (=N*IREF) that is N times greater than the reference current IREF. N may be a positive real number.

The third current generator 330 is connected between the first node N21, a third node N23, and the ground voltage GND, and generates a third current ISUB corresponding to a difference between the first current ICP and the second current IMR. Therefore, a relationship between the third current ISUB, the first current ICP, and the second current IMR may be ISUB=ICP−N*IREF.

The fourth current generator 340 is connected between the second power supply voltage VDD2, the third node N23, and an output node N24, and generates a sensing current ISEN that is two times greater than the third current ISUB.

Therefore, a relationship between the sensing current ISEN and the third current ISUB is ISEN=2*ISUB. A level of the first power supply voltage VDD1 may be greater than a level of the second power supply voltage VDD2.

The first current generator 311 includes a first PMOS transistor 312 and a second PMOS transistor 313. The first PMOS transistor 312 includes a source connected to the first power supply voltage VDD1, and a gate connected to an output terminal of the operational amplifier 261 of the regulator 260. The second PMOS transistor 313 includes a source connected to a drain of the first PMOS transistor 312, a gate receiving the regulator control signal RCS, and a drain connected to the first node N21. The first current ICP flows from the first power supply voltage VDD1 to the first node N21.

The reference current generator 315 includes a first PMOS transistor 316 and a second PMOS transistor 317. The first PMOS transistor 316 includes a source connected to the second power supply voltage VDD2, and a gate receiving the first bias signal BS1. The second PMOS transistor 317 includes a source connected to a drain of the first PMOS transistor 316, a gate receiving the second bias signal BS2, and a drain connected to the second node N22. The reference current IREF flows from the second power supply voltage VDD2 to the second node N22.

The second current generator 320 includes first through fourth NMOS transistors 321-324. The first NMOS transistor 321 includes a drain connected to the first node N21. The second NMOS transistor 322 includes a drain connected to a source of the first NMOS transistor 321, and a source connected to the ground voltage GND. The third NMOS transistor 323 includes a drain connected to the second node N22, and a gate connected to a gate of the first NMOS transistor 321. The fourth NMOS transistor 324 includes a drain connected to a source of the third NMOS transistor 323, a drain connected to the ground voltage GND, and a gate connected to a gate of the second NMOS transistor 322. The gate of the fourth NMOS 324 transistor is connected to the second node N22, and the second current N*IREF flows from the first node N21 to the ground voltage GND through the first and second NMOS transistors 321 and 322.

The third current generator 330 includes first through fourth NMOS transistors 331-334. The first NMOS transistor 331 includes a drain connected to the first node N21. The second NMOS transistor 332 includes a drain connected to a source of the first NMOS transistor 331, and a source connected to the ground voltage GND. The third NMOS transistor 333 includes a drain connected to the third node N23, and a gate connected to a gate of the first NMOS transistor 331. The fourth NMOS transistor 334 includes a drain connected to a source of the third NMOS transistor 333, a source connected to the ground voltage GND, and a gate connected to a gate of the second NMOS transistor 332. The gate of the fourth NMOS transistor 334 is connected to the first node N21, and the third current ISUB flows from the first node N21 to the ground voltage GND through the first and second NMOS transistors 331 and 332.

The fourth current generator 340 includes first through fourth PMOS transistors 341-344. The first PMOS transistor 341 includes a source connected to the second power supply voltage VDD2. The second PMOS transistor 342 includes a source connected to a drain of the first PMOS transistor 341, and a drain connected to the third node N23. The third PMOS transistor 343 includes a source connected to the second power supply voltage VDD2, and a gate connected to a gate of the first PMOS transistor 341. The fourth PMOS transistor 344 includes a source connected to a drain of the third PMOS transistor 343, a drain connected to the output node N24, and a gate connected to a gate of the second PMOS transistor 342. The gate of the third PMOS transistor 343 is connected to the third node, and the sensing current ISEN from the second power supply voltage VDD2 through the third and fourth PMOS transistors 343 and 344 is output at the output node N24.

The second current ISUB may correspond to ICP (=IREG)−N*IREF, and the sensing current ISEN may correspond to 2*(IREG−N*IREF). Because a value of the N*IREF is known, the regulator current IREG may be monitored using the sensing current ISEN. In addition, because the sensing current ISEN may correspond to 2*(IREG−N*IREF), the sensing current ISEN increases as the regulator current IREG increases.

Therefore, the current monitor 310 may output the first sensing current ISEN1 in the preset phase of the stand-by mode and may output the second sensing current ISEN2 in the detection phase of the stand-by mode.

Figure 10:
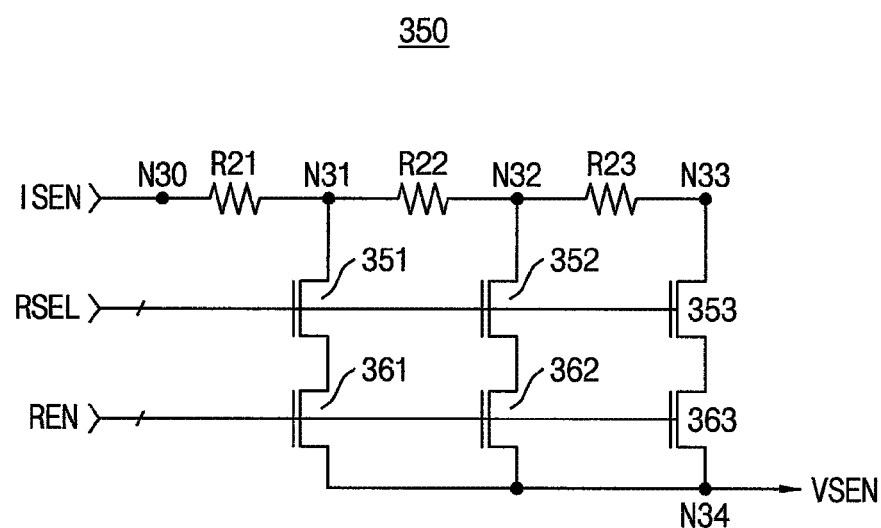
FIG. 10 is a circuit diagram illustrating a current to voltage convert in the tag detector of FIG. 8.

FIG. 10 is a circuit diagram illustrating the I/V converter in the tag detector of FIG. 8.

Referring to FIG. 10, the I/V converter 350 includes a plurality of resistors R21, R22, and R23, a plurality of first NMOS transistors 351-353, and a plurality of second NMOS transistors 361-363.

The plurality of resistors R21, R22, and R23 are connected in series between an input node N30 and a final node N33. The sensing current ISEN is input to the input node N30. The first NMOS transistors 351-353 are connected to connection nodes N31 and N32 between the resistors R21, R22, and R23 and the final node N33. The second NMOS transistors 361363 are connected between the first NMOS transistors 351353 and an output node N34 at which the sensing voltage VSEN is provided. Each gate of the first NMOS transistors 351353 receives a corresponding bit of the resistor selection signal RSEL, and each gate of the second NMOS transistors 361363 receives a corresponding bit of the resistor enable signal REN. Thus, a resistance of the I/V converter 350 may be determined by the resistor selection signal RSEL and the resistor enable signal REN.

For example, when the NMOS transistors 351 and 361 are turned-on and the NMOS transistors 352, 353, 362 and 363 are turned-off in response to the resistor selection signal RSEL and the resistor enable signal REN, the resistance of the I/V converter 350 may correspond to a resistance of the resistor R21, and the sensing voltage VSEN may correspond to ISEN*R21. The I/V converter 350 may provide the sensing voltage VSEN to the ADC 370.

The I/V converter 350 may convert the first sensing current ISEN1 to the first sensing voltage VSEN1 in the preset phase of the stand-by mode and may convert the second sensing current ISEN2 to the second sensing voltage VSEN2 in the detection phase of the stand-by mode.

Figure 11:
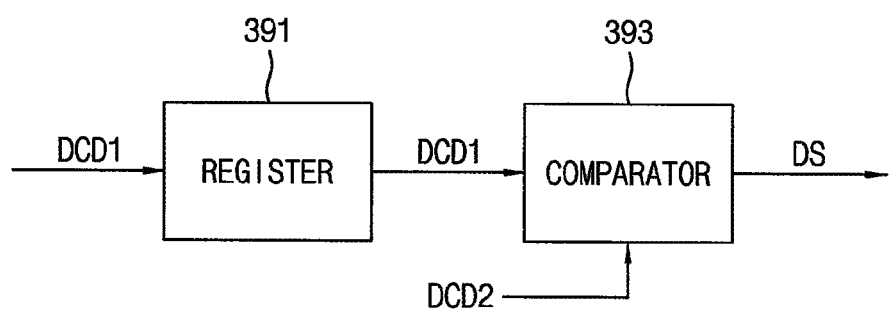
FIG. 11 is a block diagram illustrating a decision circuit in the tag detector of FIG. 8.

FIG. 11 is a block diagram illustrating the decision circuit in the tag detector of FIG. 8.

Referring to FIG. 11, the decision circuit 390 includes a register 391 and a digital comparator 393.

The register 391 may store the first digital code DCD1 provided from the ADC 370 in the preset phase of the stand-by mode. The comparator 393 may compare the first digital code DCD1 stored in the register 391 and the second digital code DCD2 provided from the ADC 370 in the detection phase of the stand-by mode to output the detection signal DS to the processor 220, which indicates whether the NFC device 20 is within the communication range of the NFC device 10a. When the NFC device 20 is within the communication range of the NFC device 10a, the second digital code DCD2 is greater than the first digital code DCD1.

In example embodiments, the decision circuit 390 may be included in the processor 220 instead of the tag detector 300. In this case, the tag detector 300 outputs the first digital code DCD1 to the processor 220 in the preset phase of the stand-by mode and outputs the second digital code DCD2 to the processor 220 in the detection phase of the stand-by mode.

Figure 12:
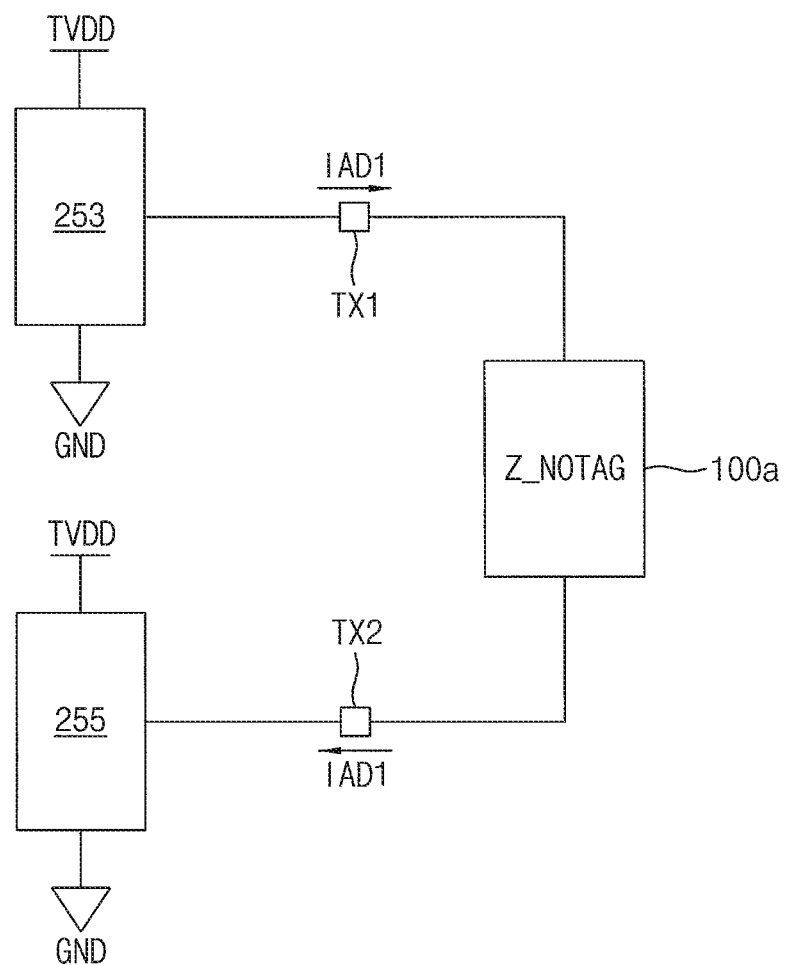
FIGS. 12 and 13 are block diagrams respectively illustrating an operation in a stand-by mode of a portion of the NFC device of FIG. 4.
Figure 13:
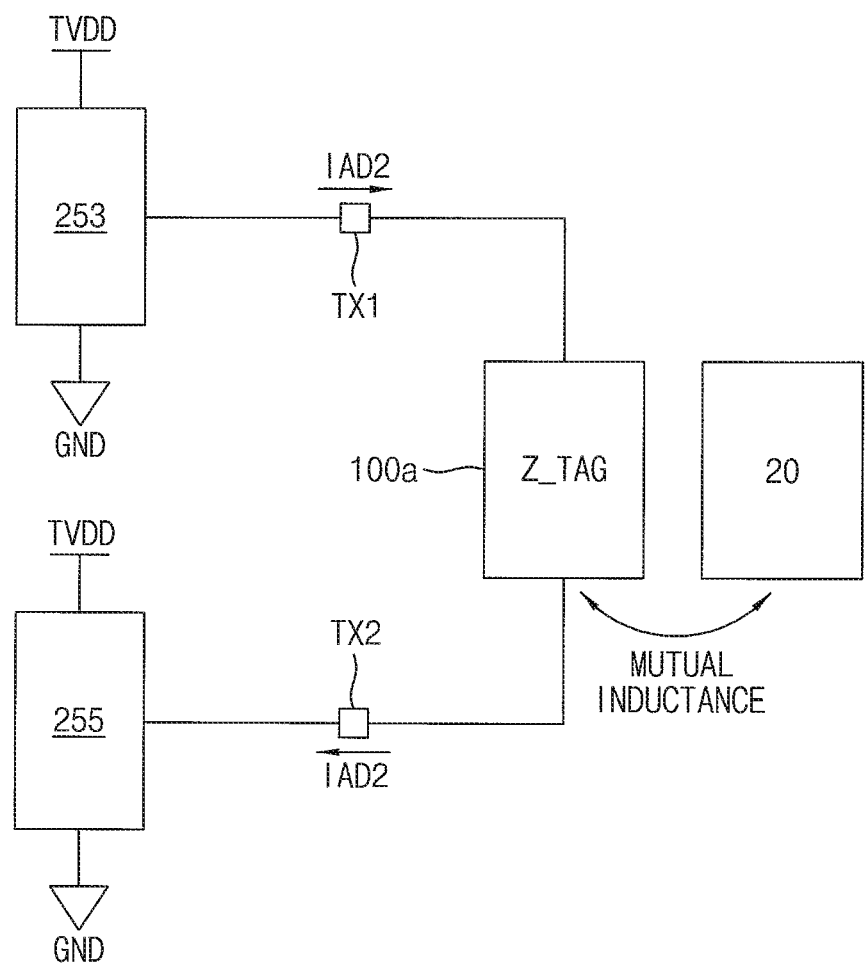

FIGS. 12 and 13 are block diagrams respectively illustrating an operation in a stand-by mode of a portion of the NFC device of FIG. 4.

FIG. 12 illustrates an example that the NFC device 20 is out of the communication range of the NFC device 10a, and FIG. 13 illustrates an example that the NFC device 20 is within the communication range of the NFC device 10a.

Referring to FIGS. 4, 5, and 12, when the NFC device 20 is out of the communication range of the NFC device 10a, a first driver current IAD1 flows from the first driver 253 of the transmitter 250, through the first transmission terminal TX1, the resonator 100a, and the second transmission terminal TX2, to the second driver 255 of the transmitter 250. In this case, an impedance of the resonator 100a corresponds to Z_NOTAG.

Referring to FIGS. 4, 5 and 13, when the NFC device 20 is within the communication range of the NFC device 10a, a second driver current IAD2 flows from the first driver 253 of the transmitter 250, through the first transmission terminal TX1, the resonator 100a, and the second transmission terminal TX2, to the second driver 255 of the transmitter 250. In this case, the resonator 100a interacts with the resonator 100 of the NFC device 10, that is, mutual inductance occurs between the resonator 100a and the resonator 100 of the NFC device 10, and the impedance of the resonator 100a, corresponding to Z_TAG, decreases compared to the impedance of Z_NOTAG. Therefore, the second driver current IAD2 is greater than the first driver current IAD1. When the second driver current IAD2 increases, the regulator current IREG also increases, and the sensing current ISEN also increases. Therefore, it is determined whether the NFC device 20 is within the communication range of the NFC device 10a by monitoring changes of the regulator current IREG.

Figure 14:
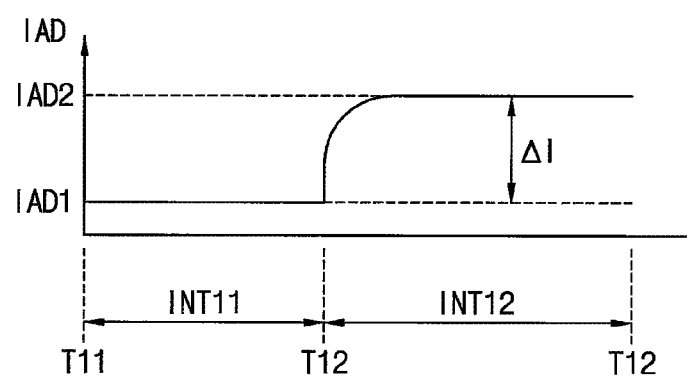
FIG. 14 is a graph illustrating a change of a driver current as an NFC device approaches an NFC device, according to example embodiments.

FIG. 14 is a graph illustrating a change of a driver current as an NFC device approaches an NFC device, according to example embodiments.

Referring to FIG. 14, the first driver current IAD1 in a first interval INT11 between time points T11 and T12 when the NFC device 20 is out of the communication range of the NFC device 10a as in FIG. 12 is smaller than the second driver current IAD2 in a second interval INT12 between time points T12 and T13 when the NFC device 20 is within the communication range of the NFC device 10a as in FIG. 13. Therefore, the current monitor 300 may determine whether the NFC device 20 is within the communication range of the NFC device 10a by detecting a difference ΔI between the second driver current IAD2 and the first driver current IAD1.

Figure 15:
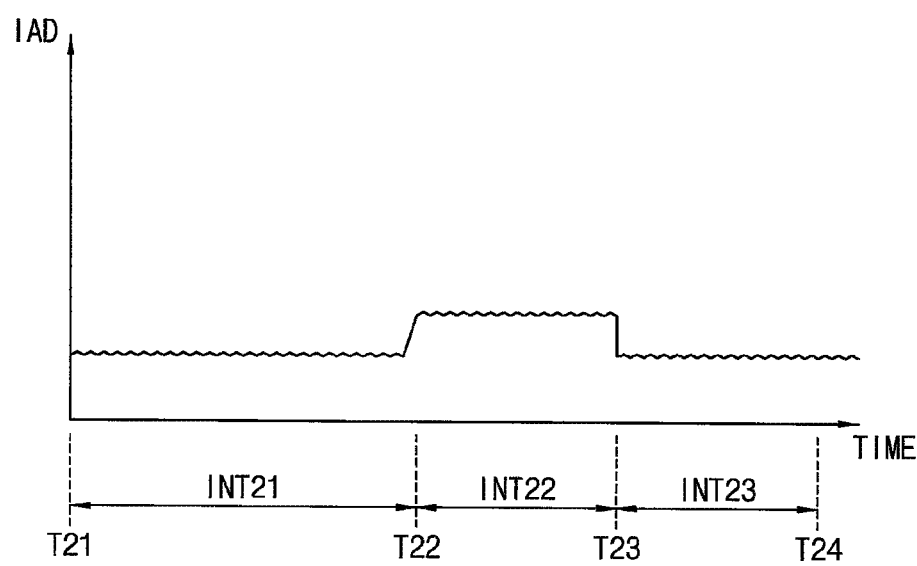
FIG. 15 is a graph illustrating a change of a driver current as an NFC device approaches an NFC device, according to other example embodiments.

FIG. 15 is a graph illustrating a change of a driver current as an NFC device approaches an NFC device, according to other example embodiments.

Referring to FIG. 15, a driver current in a first interval INT21 between time points T21 and T22 and in a third interval INT23 between time points T23 and T24 is smaller than a driver current n a second interval INT22 between the time points T22 and T23. That is, the NFC device 20 is out of the communication range of the NFC device 10a in the first interval INT21, is within the communication range of the NFC device 10a in the second interval INT22, and is out of the communication range of the NFC device 10a in the third interval INT23.

Figure 16:
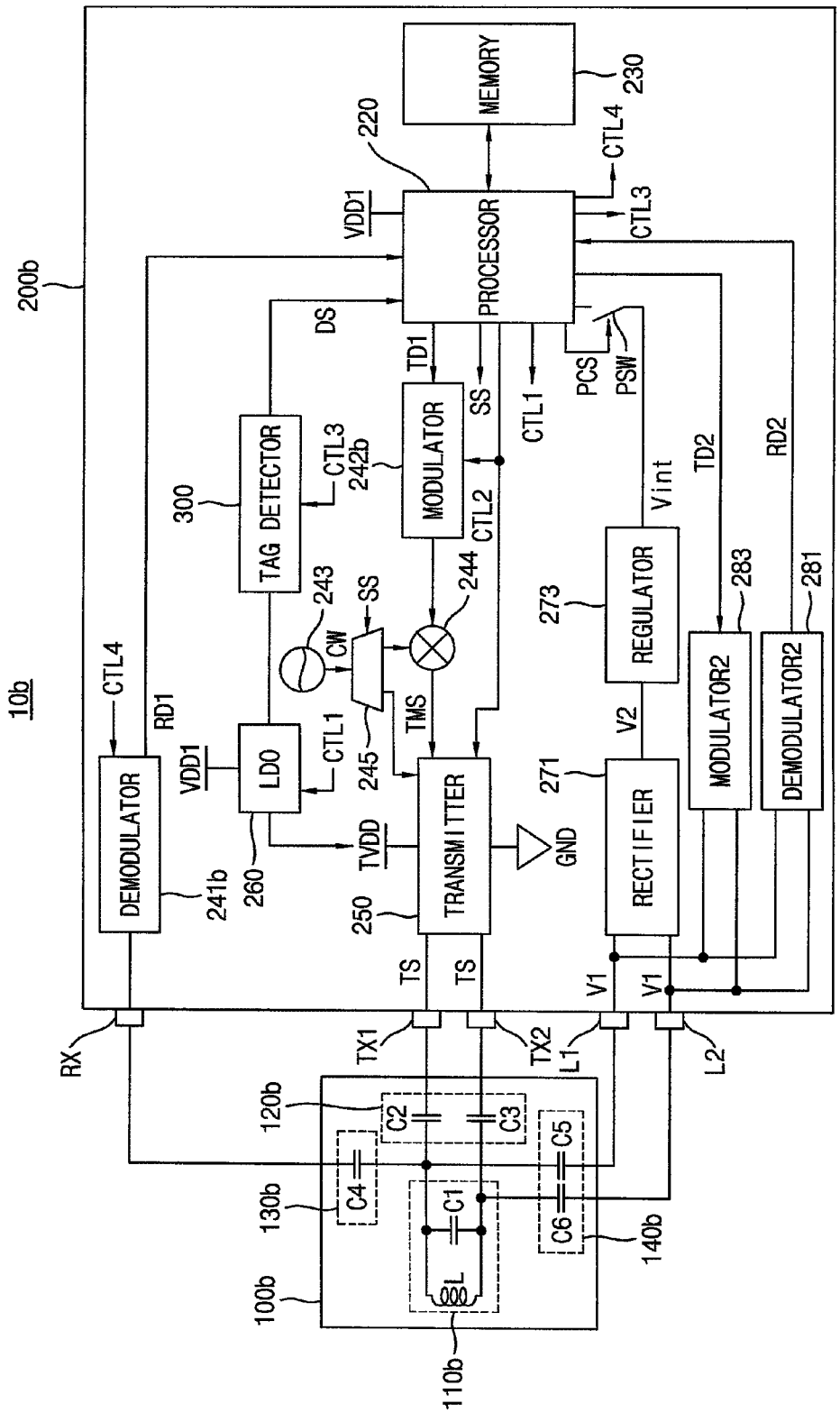
FIG. 16 is a block diagram illustrating an NFC device according to example embodiments.

FIG. 16 is a block diagram illustrating an NFC device according to example embodiments.

Elements used to operate an NFC device 10b in the reader mode as well as elements used to operate the NFC device 10b in the card mode are illustrated in FIG. 16.

Referring to FIG. 16, the NFC device 10b includes a resonator 100b and an NFC chip 200b.

The NFC chip 200b is connected to the resonator 100b through a first power terminal L1, a second power terminal L2, a first transmission terminal TX1, a second transmission terminal TX2, and a reception terminal RX.

The resonator 100b includes a resonance circuit 110b including an antenna L and a first capacitor C1, and a matching circuit 120b connected to the resonance circuit 110b, the first transmission terminal TX1 and the second transmission terminal TX2, and including a second capacitor C2 and a third capacitor C3 to perform an impedance matching. The resonator 100b further includes a first filter 130b connected to the resonance circuit 110b and the reception terminal RX, and including a fourth capacitor C4, and a second filter 140b connected to the resonance circuit 110b, the first power terminal L1, and the second power terminal L2, and including a fifth capacitor C5 and a sixth capacitor C6.

The configuration of the resonator 100b illustrated in FIG. 16 is an example only, and the configuration of the resonator 100b according to example embodiments may not be limited to the above, but may be variously modified.

The NFC chip 200b may perform the signal transmission operation and the signal reception operation through the first power terminal L1 and the second power terminal L2 in the card mode, perform the signal transmission operation through the first transmission terminal TX1 and the second transmission terminal TX2 in the reader mode, and perform the signal reception operation through the reception terminal RX in the reader mode.

The NFC chip 200b includes the processor 220, the memory 230, a first demodulator 241b, a first modulator 242b, the oscillator 243, the mixer 244, the demultiplexer 245, the transmitter 250, the regulator 260, the tag detector 300, a rectifier 271, a regulator 273, a power switch PSW, a second demodulator 281, and a second modulator 283.

The processor 220, the memory 230, the first demodulator 241b, the oscillator 243, the mixer 244, the demultiplexer 245, the transmitter 250, the regulator 260, and the tag detector 300 may be equivalent to corresponding components in the NFC device 10a of FIG. 4. The first demodulator 241b generates a first reception data RD1, and the first modulator 242b modulates a first transmission data TD1.

The processor 220 provides a power control signal PCS to the power switch PSW to control a switching operation of the power switch PSW.

The rectifier 271 generates a second voltage V2 by rectifying a first voltage V1. The regulator 273 generates an internal voltage Vint having a voltage level of a predetermined magnitude usable in the NFC chip 200a by using the second voltage V2, and provides the internal voltage Vint to the power switch PSW.

The processor 220 may control the overall operation of the NFC chip 200. The processor 220 may operate by receiving the first power supply voltage VDD1 from a power source, such as a battery. In addition, the processor 220 may receive the internal voltage Vint through the power switch PSW. When the first power supply voltage VDD1 has a predetermined level or more, the processor 220 may operate by using the first power supply voltage VDD1 and disable a power control signal PCS to turn off the power switch PSW. When the first power supply voltage VDD1 has a level less than the predetermined level, the processor 220 enables the power control signal PCS to turn on the power switch PSW such that the processor 220 may be operated by using the internal voltage Vint supplied from the regulator 273.

When the signal reception operation is performed in the card mode, the second demodulator 281 generates a second reception data RD2 by demodulating the signal supplied from the resonator 100b through the first and second power terminals L1 and L2 to provide the second reception data RD2 to the processor 220. The processor 220 may decode the second reception data RD2 and may store some or all of the second reception data RD2 in the memory 230.

When the signal transmission operation is performed in the card mode, the processor 220 may read out the output data from the memory 220 and encodes the output data to provide a second transmission data TD2 to the second modulator 283, and the second modulator 283 modulates the second transmission data TD2 to provide a modulation signal to the first and second power terminals L1 and L2.

The regulator 260 is connected to the first power supply voltage VDD1 and provides the transmission power supply voltage TVDD to the transmitter 250. The regulator 260 is implemented with an LDO regulator and may adjust a level of the transmission power supply voltage TVDD in response to a control signal CTL1 from the processor 220.

The tag detector 300 is connected to the regulator 260, may monitor a current (regulator current) flowing in the regulator 260 when the electromagnetic wave EMW is radiated through the resonator 100a respectively in the preset phase and the detection phase, and may determine whether the NFC device 20 is within a communication range of the NFC device 10b based on a comparison of the first sensing current in the preset phase and the second sensing current in the detection phase.

The tag detector 300 may determine whether the NFC device 20 is within a communication range of the NFC device 10b and outputs the detection signal DS to the processor 220, which indicates whether the NFC device 20 is within a communication range of the NFC device 10b. The processor 220 receives the detection signal DS and may determine an operation mode of the NFC device 10a based on a logic level of the detection signal DS.

Figure 17:
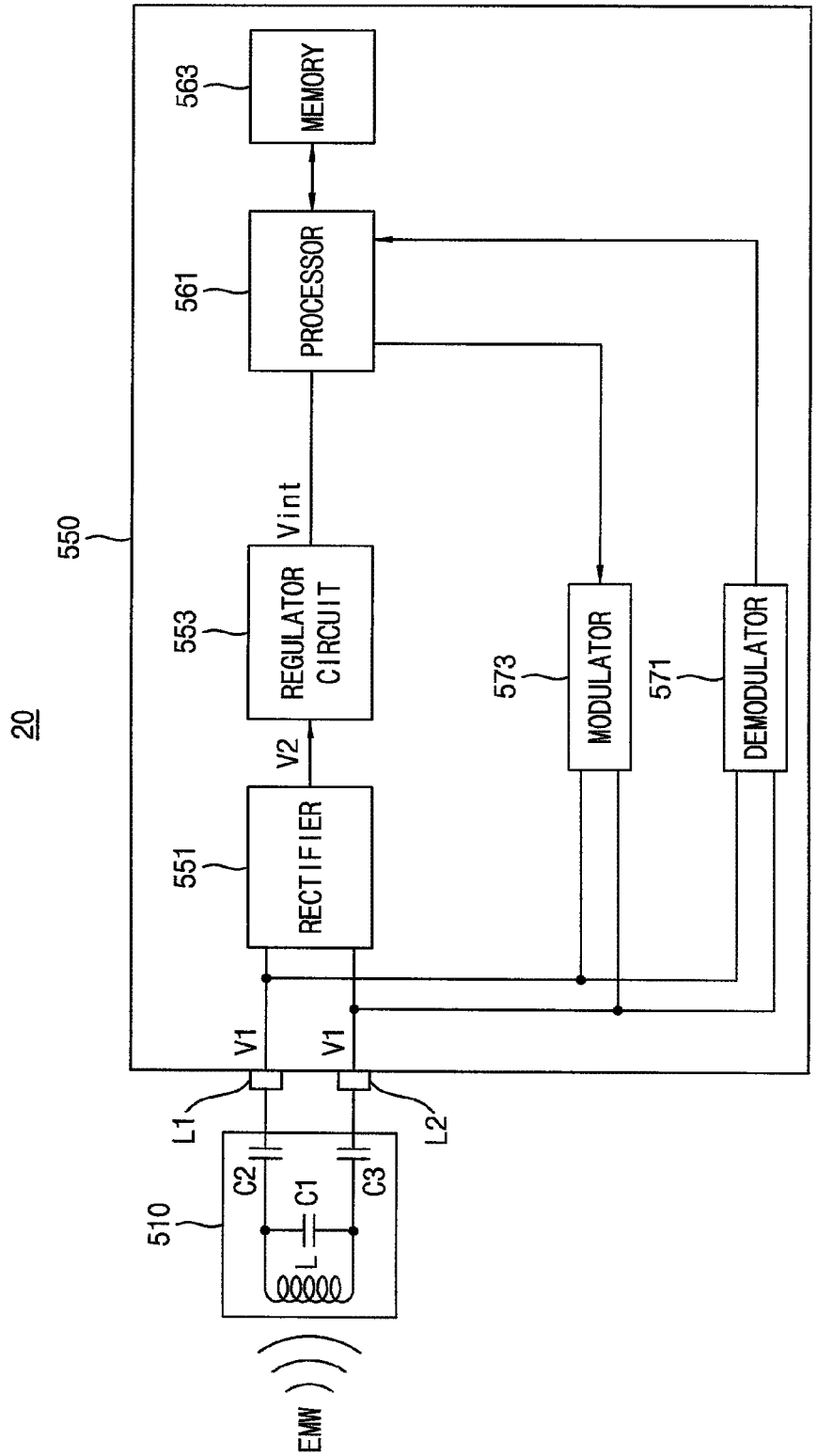
FIG. 17 is a block diagram illustrating an NFC device in FIG. 1 according to example embodiments.

FIG. 17 is a block diagram illustrating the NFC device in FIG. 1.

Referring to FIGS. 1 and 17, the NFC device 20 includes resonator 510 and the NFC chip 550.

The NFC chip 550 is connected to the resonator 510 through first and second power terminals L1 and L2.

The resonator 510 includes a resonance circuit including an antenna L, a first capacitor C1, second and third capacitors C2 and C3 through which transfers induced voltage induced in response to electromagnetic wave EMW to the first and second power terminals L1 and L2, and a filter including a third capacitor C13. The resonator 510 transfers the induced voltage in response to electromagnetic wave EMW as a first voltage V1 to the NFC chip 550.

The configuration of the resonator 510 illustrated in FIG. 17 may be an example only, and the configuration of the resonator 510 according to example embodiments may not be limited to the above, but may be various modified.

The NFC chip 550 receives the first voltage V1 from the resonator 510 through the first and second power terminals L1 and L2.

The NFC chip 550 includes a rectifier 551, a regulator circuit 553, a processor 561, a memory 563, a demodulator 571, and a modulator 573.

The rectifier 551 rectifies the first voltage V1 to generate a second voltage V2 that is direct-current (DC) voltage.

The regulator circuit 553 may generate and provide to the processor 561, the demodulator 571, and the modulator 573, an internal voltage Vint with a regular level, which is used in the NFC chip 550.

The processor 561 may control overall operations of the NFC chip 550. When a reception operation is performed, the demodulator 571 may demodulate a signal provided through the first and second power terminals L1 and L2 from the resonator 510 to generate input data, and provides the input data to the processor 561. The processor 561 may store the input data in the memory 563.

When a transmission operation is performed, the processor 561 may read out output data from the memory 563 to provide the output data to the modulator 573. The modulator 573 may modulate the output data to provide a modulated signal to the first and second power terminals L1 and L2. For example, the modulator 573 may perform a load modulation for the output data to generate the modulated signal.

Figure 18:
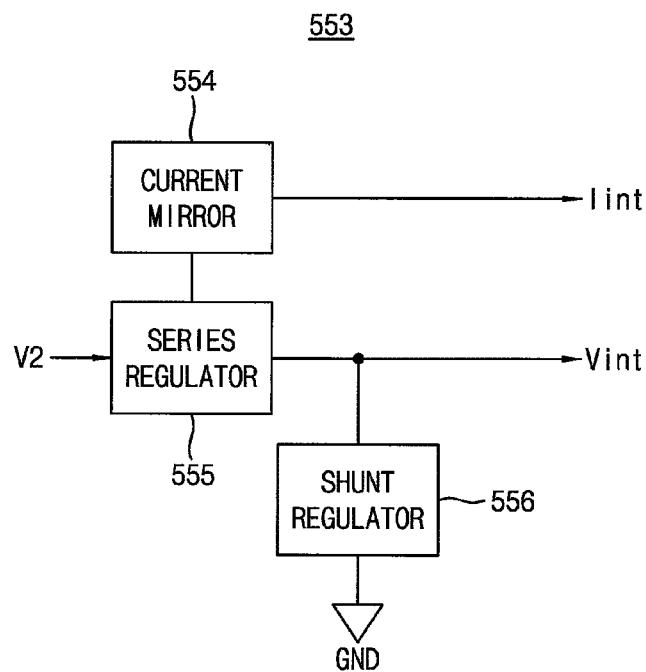
FIG. 18 is a block diagram illustrating a regulator circuit in FIG. 17.

FIG. 18 is a block diagram illustrating the regulator circuit in FIG. 17.

Referring to FIG. 18, the regulator circuit 553 includes a series regulator 555, a shunt regulator 556 and a current mirror 554.

The series regulator 555 receives the second voltage V2 from the rectifier 551, and the shunt regulator 556 is connected between an output terminal of the series regulator 555 and a ground voltage GND. Thus, the series and shunt regulators 555 and 556 generate the internal voltage Vint having the regular level that is usable in the NFC chip 550 using the second voltage V2.

The current mirror 554 generates an internal current lint having an intensity proportional to that of a current flowing through the series regulator 555.

Figure 19:
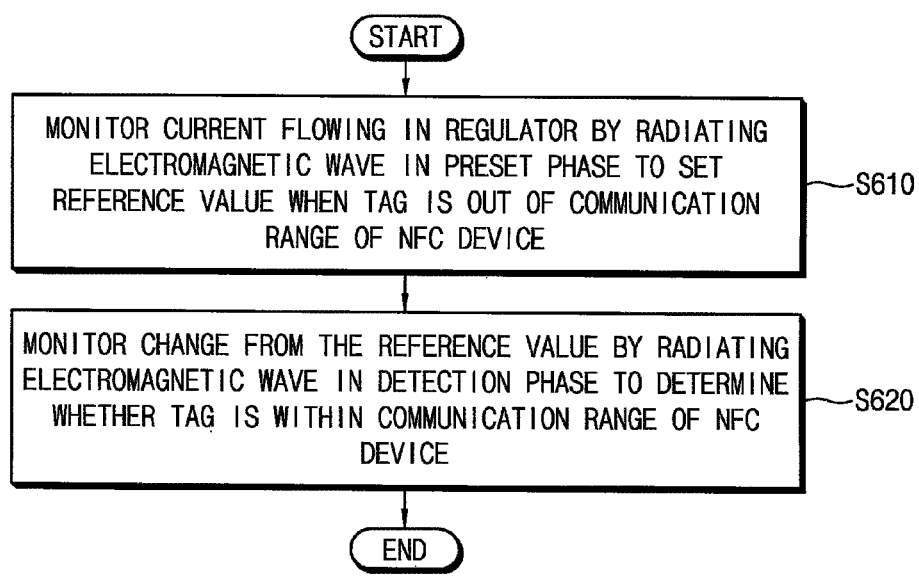
FIG. 19 is a flow chart illustrating a method of detecting a tag in an NFC device, according to example embodiments.

FIG. 19 is a flow chart illustrating a method of detecting a tag in an NFC device, according to example embodiments.

Referring to FIGS. 1, 4 through 16, and 19, in a method of detecting a tag in an NFC device, the NFC device 10 monitors a current flowing in the regulator 260 by radiating an electromagnetic wave EMW (or, carrier wave) in a preset phase of the stand-by mode to set a reference value when an NFC device 20 or tag is out of communication range of the NFC device 10 (S610). The reference value may be a first digital code DCD1 corresponding to an amount of the current flowing in the regulator 260, which is monitored in the preset phase. The NFC device 10 radiates the electromagnetic wave EMW in a detection phase of the stand-by mode, and monitors a change of the current flowing in the regulator 260 from the reference value to determine whether the NFC device 20 or tag is within the communication range of the NFC device 10 (S620). The NFC device 20 may determine whether the NFC device 20 is within the communication range of the NFC device 10 by comparing the first digital code DCD1 with a second digital code DCD2 corresponding to an amount of the current flowing in the regulator 260 in the detection phase.

Figure 20:
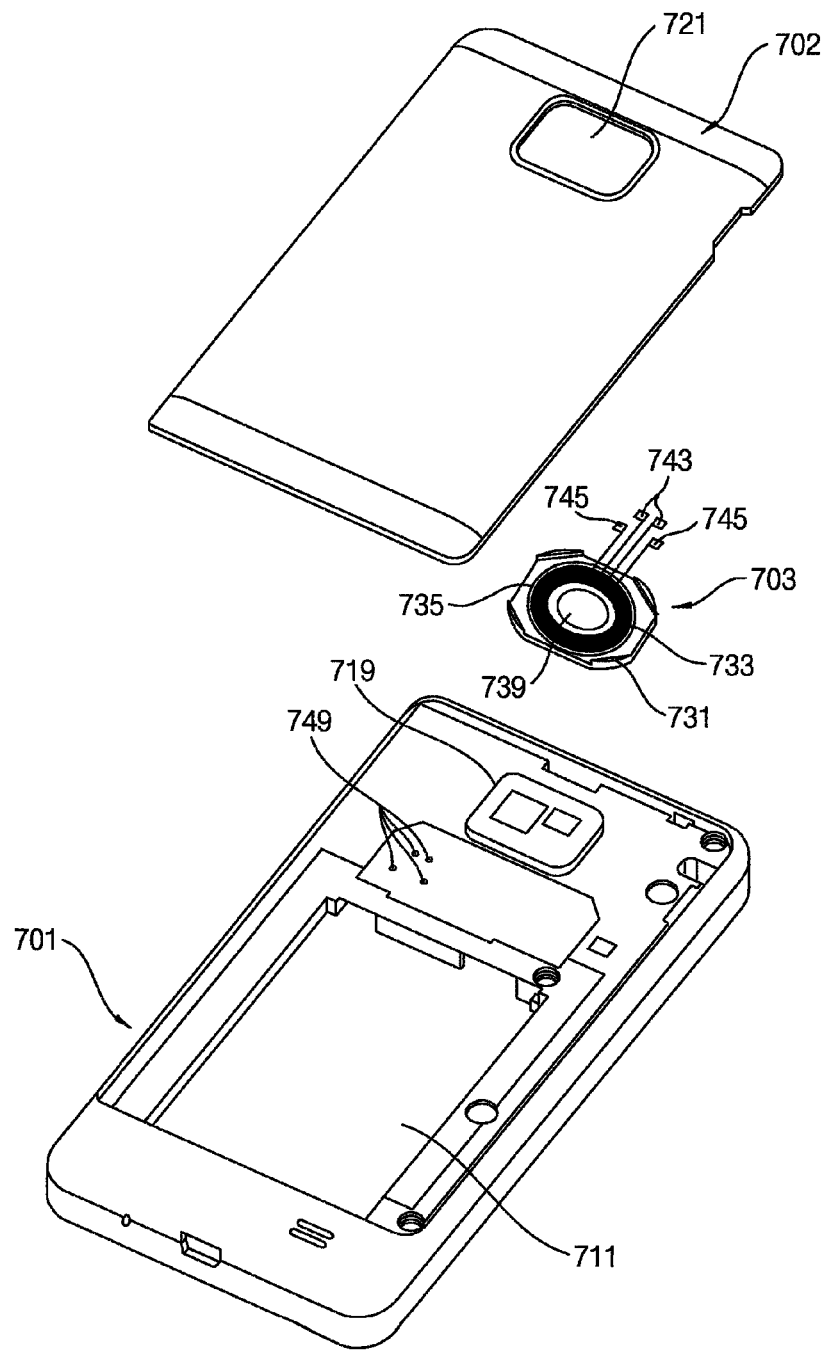
FIG. 20 is an exploded perspective view of a portable terminal according to example embodiments.

FIG. 20 is an exploded perspective view of a portable terminal according to example embodiments.

Figure 21:
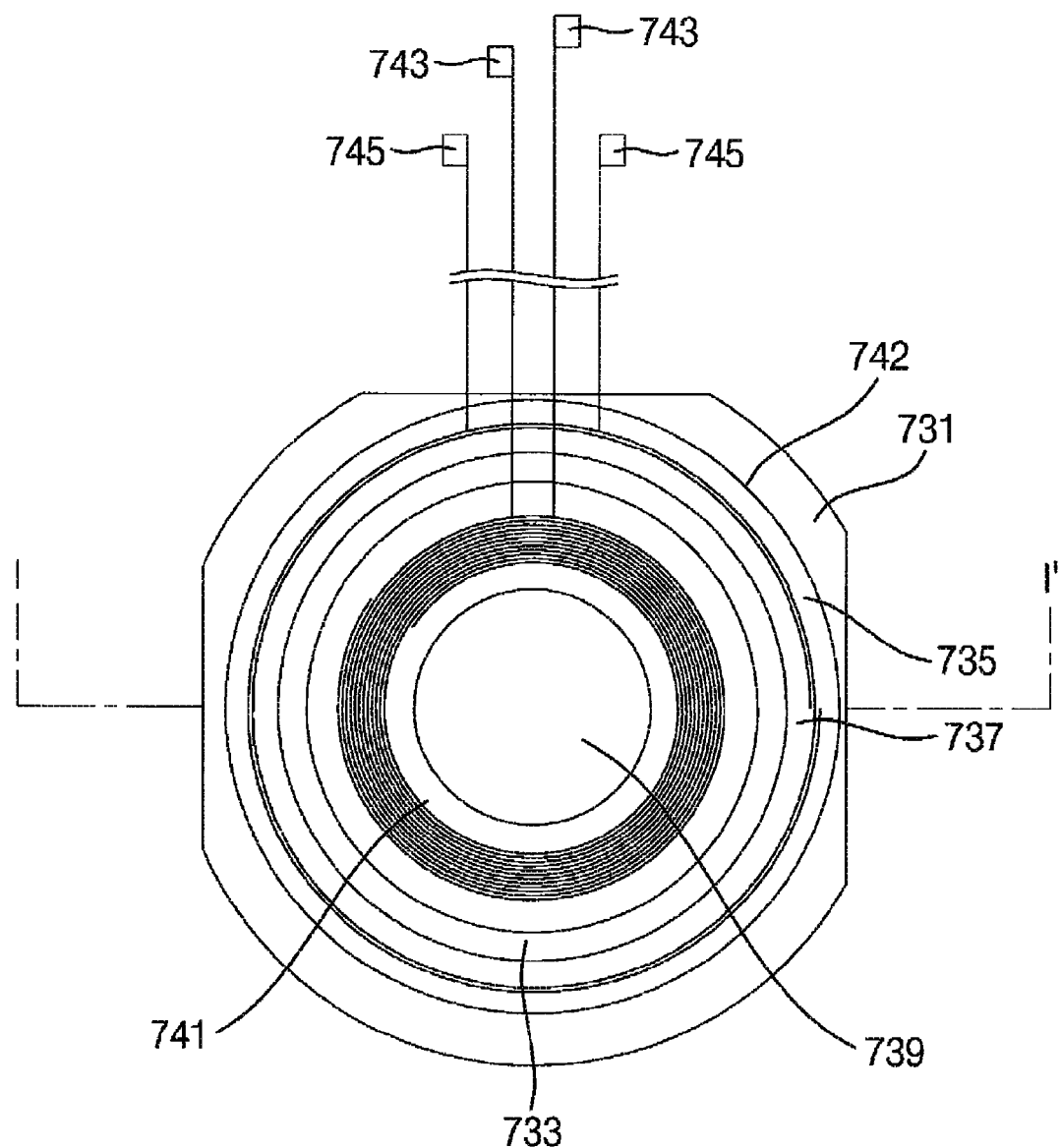
FIG. 21 is a plan view of a coil portion in the mobile device of FIG. 20.

FIG. 21 is a plan view of a coil portion in the mobile device of FIG. 20.

Figure 22:
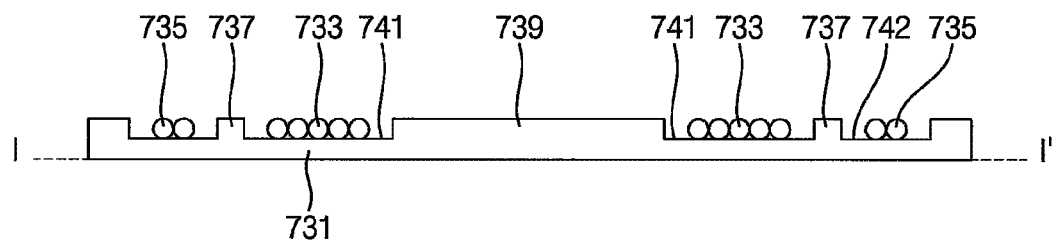
FIG. 22 is a cross-sectional view of the coil portion in FIG. 21 taken along I-I'.

FIG. 22 is a cross-sectional view of the coil portion in FIG. 21 taken along I-I'.

Referring to FIGS. 20 to 22, a portable terminal 700 (also referred to as a mobile device or a smartphone) includes a shielding member 731 attached to an inner surface of an external part such as a battery cover 702 or a housing 701, and a pair of coils 733 and 735 attached to the shielding member 731. The coils 733 and 735 are mounted on a same plane. The shielding member 731 and the coils 733 and 735 are collectively referred to herein as a coil portion 703.

Referring to FIG. 22, the portable terminal 700 is a bar type terminal including a touch screen display. Other types of terminals are envisioned within the scope of this disclosure, including different physical form factors and display types. The display, function keys (such as Start/End and Select keys), a transmitter, and a receiver are installed on a front surface of the housing 701.

Referring again to FIGS. 20 to 22, the housing 701 is provided on a rear surface of the portable terminal 700, with a battery mounting recess 711 for accommodating a battery pack. The battery cover 702 covers the battery mounting recess 711. A plurality of terminals 749 and a camera 719 are installed at one side of the battery mounting recess 711, with the terminals 749 also being covered by the battery cover 702. An opening 721 penetrates through both surfaces of the battery cover 702. The camera 719 is accommodated in the opening 721, thereby securing a capturing path. At least one among a connector terminal, a memory slot, a volume key, and a camera shutter switch may be arranged on a side surface of the housing 701.

The coil portion 703 is attached to the inner surface of the battery cover 702 and is connected to the circuits of the portable terminal 700, (e.g., a communication circuit or a charging circuit) via the plurality of terminals 749. As illustrated in FIGS. 20 to 22, the coil portion 703 includes the shielding member 731 and the coils 733 and 735.

Referring to FIG. 21, the shielding member 731 may be formed by injection molding, and includes first and second accommodation grooves 741 and 742 respectively on a surface thereof. The first and second accommodation grooves 741 and 742 respectively are circular in shape and recessed into one surface of the shielding member 731. The second accommodation groove 742 surrounds the first accommodation groove 741, being concentric with the first accommodation groove 741. A shielding wall 737 is interposed between the first and second accommodation grooves 741 and 742.

A pellet includes a mixture of metal powder containing an iron (Fe) component and synthetic resin is injection-molded into the shielding member 731. The synthetic resin is Poly Carbonate (PC), Poly Amide (PA), Acrylonitrile-Butadiene-Styrene (ABS) copolymer, or Nylon. As stated above, the shielding member 731 contains the iron component preventing mutual interference between the coils 733 and 735, and prevents the coils 733 and 735 from impacting circuits within the portable terminal 700, caused by electronic waves generated from high-frequency waves, low-frequency waves, or power applied to the coils 733 and 735.

As illustrated in FIGS. 21 and 22, the first coil 733 is accommodated in the first accommodation groove 741, and the second coil 735 is accommodated in the second accommodation groove 742. The first coil 733 and the second coil 735 are formed by spirally winding enamel-insulated conductor wires.

The first coil 733 and the second coil 735 are accommodated in the first and second accommodation grooves 741 and 742, respectively, and the second coil 735 surrounds the first coil 733. Herein, the shielding wall 737 between the first coil 333 and the second coil 335 provides a shielding effect between the coils. In other words, the shielding wall 337 shields interference of electronic waves between the first and second coils 333 and 335 respectively. The first coil 333 and the second coil 335 include connection ends 343 and 345, respectively, extended from one side of the shielding member 331. The connection ends 343 and 345 are connected to circuits of the portable terminal 300 via the plurality of terminals 349 provided on the housing 301.

When installed, the first coil 733 and the second coil 735 are exposed from one surface of the shielding member 731. However, the first coil 733 and the second coil 335 face the inner surface of the battery cover 702 when the shielding member 731 is attached to the battery cover 702, thereby covering the first and second coils 733 and 735 respectively. Consequently, the first coil 733 and the second coil 735 are covered by the shielding member 731 and the battery cover 702.

One among the first and second coils 733 and 735 respectively may be used as a secondary coil for wireless charging, and the other coil may be used as an NFC antenna element. The coils 733 and 735 may also be used as antennas for short-range wireless communication, (e.g., Bluetooth or terrestrial multimedia broadcasting antennas). Example embodiments utilize the first coil 733 as a secondary coil for wireless charging and utilize the second coil 735 as an NFC antenna element.

For wireless charging, the portable terminal 700 may be cradled on a charging cradle to align a primary coil of a charger with the secondary coil of the portable terminal 700 corresponding to the first coil 733. Alternatively, the primary coil is movably mounted in the charging cradle such that when the portable terminal 700 is positioned on the charging cradle, the primary coil is moved to align with the portable terminal 700.

To align the primary coil of the charging cradle with the first coil 733 of the portable terminal 700, the shielding member 731 includes a protrusion portion 739. The protrusion portion 739 protrudes from the first accommodation groove 741 of the shielding member 731. Because the shielding member 731 contains the iron component, the protrusion portion 739 also contains an iron component. That is, because the protrusion portion 739 contains a paramagnetic material, (e.g., the iron component), when the protrusion portion 739 is positioned within the magnetic field of a permanent magnet, an attraction force of the permanent magnet pulls on the protrusion portion 739.

The permanent magnet is attached to the primary coil of the charging cradle. When the portable terminal 700 is mounted on the charging cradle, the attraction force between the permanent magnet and the shielding member 731 (the protrusion portion 739) aligns the primary coil of the charging cradle with the first coil 733 of the portable terminal 700. Furthermore, while the protrusion portion 739 contains the iron component and thus has a paramagnetic property, the protrusion portion 739 includes an additional magnetic portion attached on the first accommodation groove 741 to increase the attraction force between the permanent magnet of the primary coil and the shielding member 731. The additional magnetic portion is formed of a paramagnetic material.

Figure 23:
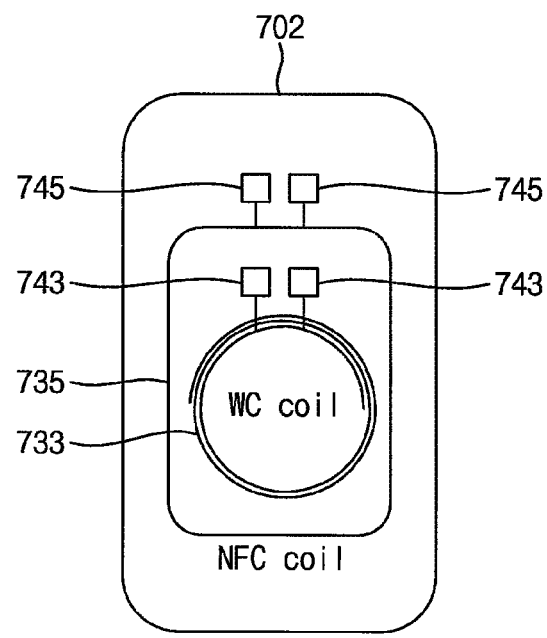
FIG. 23 is a plan view illustrating mounting of the coil portion of FIG. 21 to a battery cover of the portable terminal.

FIG. 23 is a plan view illustrating mounting of the coil portion of FIG. 21 to the battery cover of the portable terminal of FIG. 20.

Figure 24:
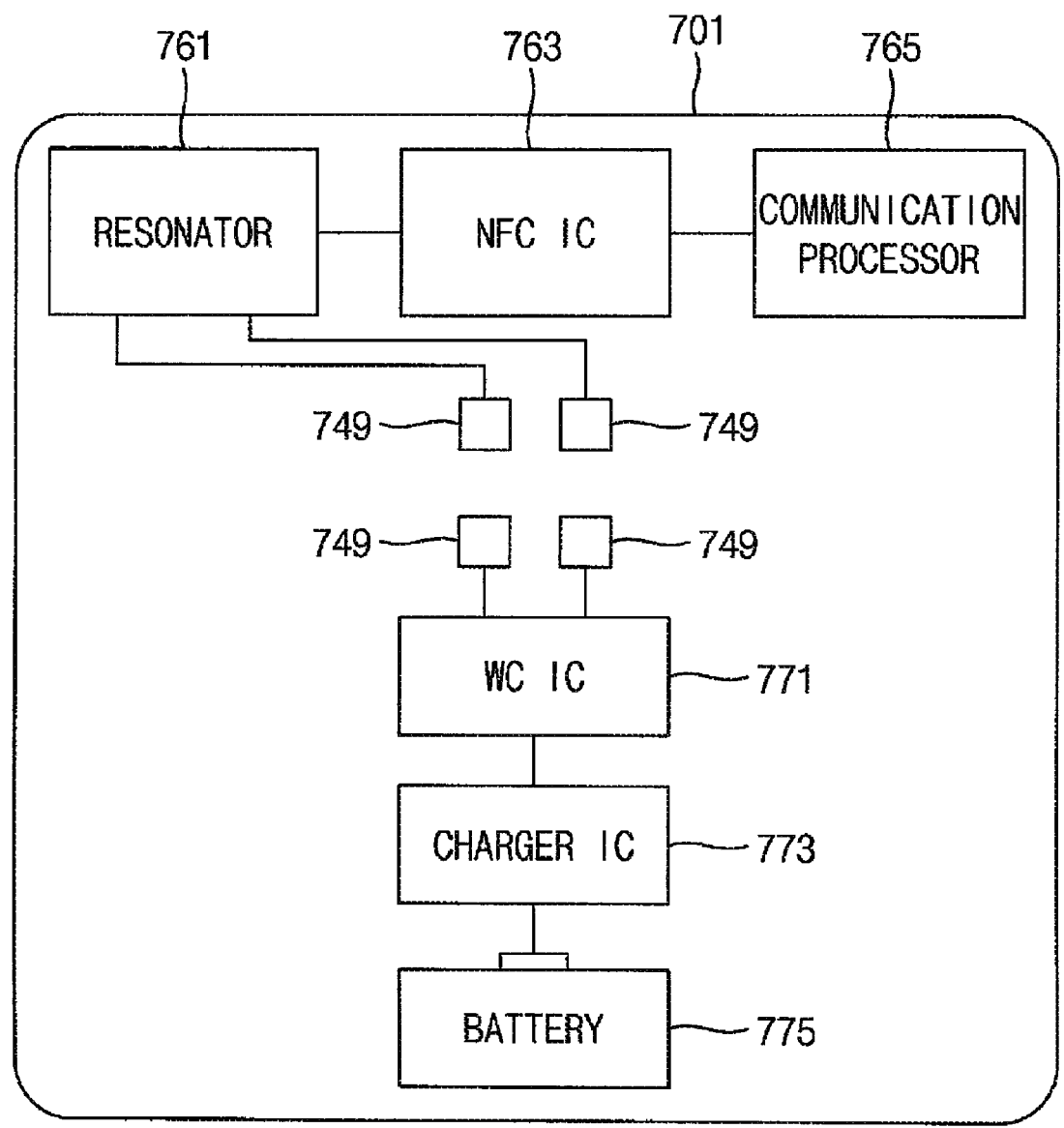
FIG. 24 is a block diagram illustrating the portable terminal of FIG. 20 with which the battery cover of FIG. 23 is combinable.

FIG. 24 is a block diagram illustrating the portable terminal of FIG. 20 with which the battery cover of FIG. 23 is combinable.

FIG. 23 and FIG. 24 illustrate configurations of the portable terminal 700 that implements both a wireless charging function and an NFC function using the coil portion 703, with the first coil 733 as a secondary coil used for wireless charging and the second coil 735 as an antenna element for NFC, by way of example.

FIG. 23 illustrates mounting of the coil portion 703 on the battery cover 702 of the portable terminal 700, and FIG. 24 illustrates the housing 701 to be combined with the battery cover 702 illustrated in FIG. 23.

To implement the wireless charging function and the NFC function using the first and second coils 733 and 735 respectively, the coils 733 and 735 are connected to a communication processor 765 and a charge integrated circuit (IC) 773, respectively. A resonator 761 and an NFC IC 763 or a wireless charger (WC) IC 771 is disposed on a connection of the first coil 733 or the second coil 735 to a circuit of the portable terminal 700. These ICs control current and voltage during charging. The resonator 761 may employ the resonator 100a of FIG. 4 or the resonator 100b of FIG. 16, and the NFC IC 763 may employ the NFC chip 200a of FIG. 4 or the NFC chip 200b of FIG. 16. Therefore, the NFC IC 763 may determine whether an NFC device is within a communication range of the NFC IC 763 by monitoring a current flowing in a regulator that provides a transmission power supply voltage to a transmitter in the stand-by mode.

According to example embodiments in FIG. 23 and FIG. 24, the NFC IC 763 is connected to the communication processor 765 of the portable terminal 700 and to the second coil 735 mounted to the battery cover 702 via the plurality of terminals 749. The charger IC 773 is installed inside the portable terminal 300 and connected to a battery 775 or battery pack. In addition, the WC IC 771 is connected to the charger IC 773 inside the portable terminal 700 and to the first coil 733 mounted to the battery cover 702 through the remaining plurality of terminals 749.

Figure 25:
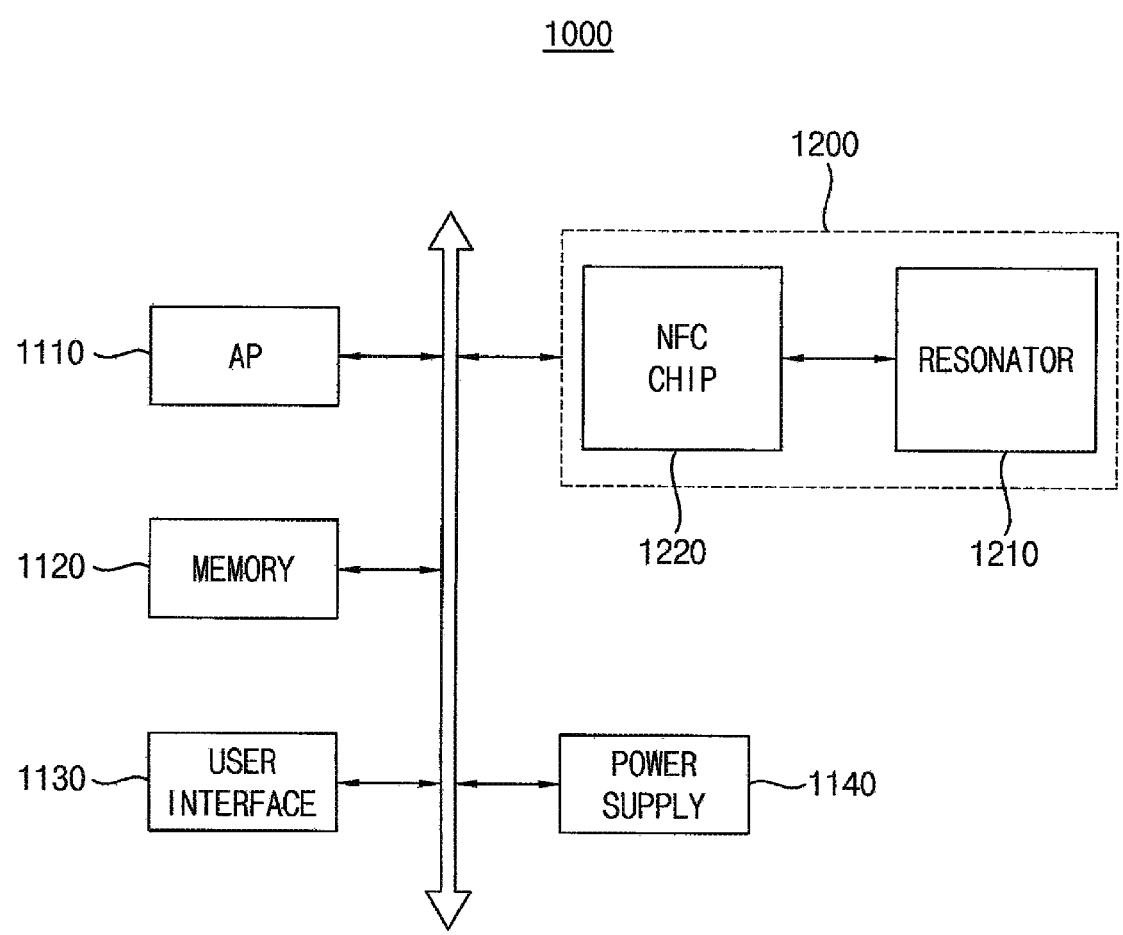
FIG. 25 is a block diagram illustrating an electronic device according to example embodiments.

FIG. 25 is a block diagram illustrating an electronic device according to example embodiments.

Referring to FIG. 25, an electronic device 1000 includes an application processor (AP) 1110, an NFC device 1200, a memory device 1120, a user interface 1130, and a power supply 1140. In example embodiments, the electronic device 1000 may be a mobile phone, a smartphone, a personal digital assistant (PDA), a portable multimedia player (PMP), a digital camera, a music player, a portable game console, a navigation system, a laptop computer, or the like.

The application processor 1110 may control overall operations of the electronic device 1000. The application processor 1110 may execute applications, such as a web browser, a game application, a video player, etc. In example embodiments, the application processor 1110 may include a single core or multiple cores. For example, the application processor 1110 may be a multi-core processor, such as a dual-core processor, a quad-core processor, a hexa-core processor, etc. The application processor 1110 may include an internal or external cache memory.

The memory device 1120 may store data for an operation of the electronic device 1000. For example, the memory device 1120 may store a boot image for booting the electronic device 1000, output data to be outputted to an external device, and input data received from the external device. For example, the memory device 1120 may be an electrically erasable programmable read-only memory (EEPROM), a flash memory, a phase change random access memory (PRAM), a resistance random access memory (RRAM), a nano floating gate memory (NFGM), a polymer random access memory (PoRAM), a magnetic random access memory (MRAM) or a ferroelectric random access memory (FRAM).

The NFC device 1200 may provide the output data stored in the memory device 1120 to the external device through NFC and store the input data received from the external device through NFC into the memory device 1120. The NFC device 1200 includes a resonator 1210 and an NFC chip 1220. The resonator 1210 may employ the resonator 100a of FIG. 4 or the resonator 100b of FIG. 16, and the NFC chip 1220 may employ the NFC chip 200a of FIG. 4 or the NFC chip 200b of FIG. 16. Therefore, the NFC chip 1220 may determine whether an NFC device is within a communication range of the NFC device 1200 by monitoring a current flowing in a regulator that provides a transmission power supply voltage to a transmitter in the stand-by mode.

The user interface 1130 may include at least one input device, such as a keypad or a touch screen, and at least one output device, such as a speaker or a display device. The power supply 1140 may supply a power supply voltage to the electronic device 1000.

In example embodiments, the electronic device 1000 may further include an image processor, and/or a storage device, such as a memory card, a solid state drive (SSD), a hard disk drive (HDD) or a CD-ROM.

In example embodiments, the electronic device 1000 and/or components of the electronic device 1000 may be packaged in various forms, such as package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline IC (SOIC), shrink small outline package (SSOP), thin small outline package (TSOP), system in package (SIP), multi chip package (MCP), wafer-level fabricated package (WFP), or wafer-level processed stack package (WSP).

The example embodiments may be employed in an electronic device including an NFC device. For example, the example embodiments may be applicable to a mobile phone, a smartphone, a PDA, a PMP, a digital camera, a music player, a portable game console, a navigation system or a laptop computer.

At least one among the components, elements, modules or units represented by a block as illustrated in FIGS. 1, 4 to 6, 16 to 17, and 24 to 25 may be embodied as various numbers of hardware, software and/or firmware structures that execute respective functions described above, according to the example embodiments. For example, at least one among these components, elements, modules or units may use a direct circuit structure, such as a memory, a processor, a logic circuit, a look-up table, etc. that may execute the respective functions through controls of one or more microprocessors or other control apparatuses. Also, at least one among these components, elements, modules or units may be embodied by a module, a program, or a part of code, which contains one or more executable instructions for performing specified logic functions, and executed by one or more microprocessors or other control apparatuses. Also, at least one among these components, elements, modules or units may further include or may be implemented by a processor such as a central processing unit (CPU) that performs the respective functions, a microprocessor, or the like. Two or more of these components, elements, modules or units may be combined into one single component, element, module or unit that performs all operations or functions of the combined two or more components, elements, modules or units. Also, at least part of functions of at least one among these components, elements, modules or units may be performed by another of these components, elements, modules or units. Further, communication between the components, elements, modules or units may be performed through the bus. Functional aspects of the above example embodiments may be implemented in algorithms that execute on one or more processors. Furthermore, the components, elements, modules or units represented by a block or processing steps may employ any number of related art techniques for electronics configuration, signal processing and/or control, data processing and the like.

Although a few example embodiments have been shown and described, it would be appreciated by those skilled in the art that changes may be made in the example embodiments without departing from the principles and spirit of the disclosure, the scope of which is defined in the claims and their equivalents.

What is claimed is:

1. A tag detector of a near-field communication (NFC) device, the tag detector comprising:
    a current monitor configured to monitor a regulator current flowing in a regulator in a preset phase and a detection phase to generate a first sensing current and a second sensing current, respectively, the regulator outputting, to a transmitter of the NFC device, a transmission power supply voltage;
    a current to voltage converter configured to convert the first sensing current and the second sensing current to a first sensing voltage and a second sensing voltage, respectively;
    an analog to digital converter configured to convert the first sensing voltage and the second sensing voltage to a first digital code and a second digital code, respectively; and
    a decision circuit configured to compare the first digital code and the second digital code, and configured to output a detection signal indicating that another NFC device is within a communication range of the NFC device, based on the comparison.

2. The tag detector of claim 1, wherein the current monitor comprises:
    a first current generator connected between a first power supply voltage and a first node, connected to the regulator, and configured to generate a first current that is substantially equal to the regulator current flowing in the regulator;
    a reference current generator connected between a second power supply voltage and a second node, and configured to generate a reference current;
    a second current generator connected between the first node, the second node, and a ground voltage, and configured to generate a second current that is N times greater than the reference current, N being a positive real number;
    a third current generator connected between the first node, a third node, and the ground voltage, and configured to generate a third current based on a difference between the first current and the second current; and
    a fourth current generator connected between the second power supply voltage, the third node, and an output node, and configured to generate a sensing current that is two times greater than the third current, and wherein a first level of the first power supply voltage is greater than a second level of the second power supply voltage.

3. The tag detector of claim 2, wherein the first current generator comprises:
    a first p-channel metal-oxide semiconductor (PMOS) transistor comprising a source connected to the first power supply voltage, and a gate connected to an output terminal of an operational amplifier of the regulator; and
    a second PMOS transistor comprising a source connected to a drain of the first PMOS transistor, a gate configured to receive a regulator control signal, and a drain connected to the first node, the regulator control signal being input to the regulator, the first current flowing from the first power supply voltage to the first node.

4. The tag detector of claim 2, wherein the reference current generator comprises:
    a first p-channel metal-oxide semiconductor (PMOS) transistor comprising a source connected to the second power supply voltage, and a gate configured to receive a first bias signal; and
    a second PMOS transistor comprising a source connected to a drain of the first PMOS transistor, a gate configured to receive a second bias signal, and a drain connected to the second node, the reference current flowing from the second power supply voltage to the second node.

5. The tag detector of claim 2, wherein the second current generator comprises:
    a first n-channel metal-oxide semiconductor (NMOS) transistor comprising a drain connected to the first node;
    a second NMOS transistor comprising a drain connected to a source of the first NMOS transistor, and a source connected to the ground voltage;
    a third NMOS transistor comprising a drain connected to the second node, and a gate connected to a gate of the first NMOS transistor; and
    a fourth NMOS transistor comprising a drain connected to a source of the third NMOS transistor, a source connected to the ground voltage, and a gate connected to a gate of the second NMOS transistor and to the second node, the second current flowing from the first node to the ground voltage through the first NMOS transistor and the second NMOS transistor.

6. The tag detector of claim 2, wherein the third current generator comprises:
    a first n-channel metal-oxide semiconductor (NMOS) transistor comprising a drain connected to the first node;
    a second NMOS transistor comprising a drain connected to a source of the first NMOS transistor, and a source connected to the ground voltage;
    a third NMOS transistor comprising a drain connected to the third node, and a gate connected to a gate of the first NMOS transistor; and
    a fourth NMOS transistor comprising a drain connected to a source of the third NMOS transistor, a source connected to the ground voltage, and a gate connected to a gate of the second NMOS transistor and to the first node, the third current flowing from the first node to the ground voltage through the first NMOS transistor and the second NMOS transistor.

7. The tag detector of claim 2, wherein the fourth current generator comprises:

a first p-channel metal-oxide semiconductor (PMOS) transistor comprising a source connected to the second power supply voltage;

a second PMOS transistor comprising a source connected to a drain of the first PMOS transistor, and a drain connected to the third node;

a third PMOS transistor comprising a source connected to the second power supply voltage, and a gate connected to a gate of the first PMOS transistor and to the third node; and a fourth PMOS transistor comprising a source connected to a drain of the third PMOS transistor, a drain connected to the output node, and a gate connected to a gate of the second PMOS transistor, the sensing current flowing from the second power supply voltage to the output node through the third PMOS transistor and the fourth PMOS transistor.

8. The tag detector of claim 1, wherein the current to voltage converter comprises:

resistors connected in series between an input node to which the first sensing current and the second sensing current are input and a final node;

first n-channel metal-oxide semiconductor (NMOS) transistors connected to one or more connection nodes between the resistors and to the final node, respectively; and second NMOS transistors connected between the first NMOS transistors and an output node at which the first sensing voltage and the second sensing voltage are output.

9. The tag detector of claim 8, wherein each gate of the first NMOS transistors is configured to receive a corresponding bit of a resistor selection signal, and wherein each gate of the second NMOS transistors is configured to receive a corresponding bit of a resistor enable signal.

10. The tag detector of claim 1, wherein the decision circuit comprises:

a register configured to store the first digital code in the preset phase; and a digital comparator configured to compare the first digital code and the second digital code that are stored, and output the detection signal based on the comparison of the first digital code and the second digital code that are stored.

11. The tag detector of claim 1, wherein the decision circuit is further configured to output the detection signal in response to the second digital code being greater than the first digital code.

12. A near-field communication (NFC) device comprising:

a resonator configured to transmit and receive data to and from another NFC device through an electromagnetic wave; and an NFC chip configured to transmit output data to the resonator, and receive input data from the resonator, wherein the NFC chip comprises:

a transmitter connected to the resonator through a first transmission terminal and a second transmission terminal;

a regulator configured to output a transmission power supply voltage to the transmitter;

a tag detector connected to the regulator, and configured to:

generate a first current substantially equal to a regulator current flowing in the regulator in a preset phase and a detection phase to generate a first sensing current and a second sensing current, respectively, in response to the electromagnetic wave being radiated;

compare the first sensing current and the second sensing current; and output a detection signal indicating that the other NFC device is within a communication range of the NFC device based on the comparison; and a processor configured to change an operation mode of the NFC device from a stand-by mode to an active mode based on the detection signal.

13. The NFC device of claim 12, wherein the transmitter comprises:

a first driver comprising a first pull-up transistor connected between the transmission power supply voltage and the first transmission terminal, and a first pull-down transistor connected between the first transmission terminal and a ground voltage;

a second driver comprising a second pull-up transistor connected between the transmission power supply voltage and the second transmission terminal, and a second pull-down transistor connected between the second transmission terminal and the ground voltage; and a controller configured to output driving signals to the first driver and the second driver based on a control signal from the processor.

14. The NFC device of claim 13, wherein the regulator is further configured to gradually increase a current flowing through the first driver, the resonator, and the second driver in the preset phase in which the other NFC device is out of the communication range of the NFC device, and wherein the tag detector is further configured to generate the first sensing current based on an average of the current that is increased.

15. The NFC device of claim 12, wherein the regulator comprises:

an operational amplifier configured to compare a reference voltage and a feedback voltage;

a current generator comprising a first p-channel metal-oxide semiconductor (PMOS) transistor and a second PMOS transistor that are connected in series between a first power supply voltage and a first output node at which the transmission power supply voltage is output, the current generator being configured to generate the regulator current having a magnitude based on a regulator control signal; and a feedback circuit comprising a first resistor and a second resistor that are connected in series between the first output node and a ground voltage, the feedback circuit being configured to output the feedback voltage at a feedback node to which the first resistor and the second resistor are connected.

16. The NFC device of claim 15, wherein the first PMOS transistor comprises a gate connected to an output terminal of the operational amplifier, and wherein the second PMOS transistor comprises a gate configured to receive the regulator control signal.

17. The NFC device of claim 15, wherein the tag detector comprises:

a current monitor connected to an output terminal of the regulator, configured to receive the regulator control signal, and configured to monitor the regulator current in the preset phase and the detection phase to generate the first sensing current and the second sensing current, respectively;

a current to voltage converter configured to convert the first sensing current and the second sensing current to a first sensing voltage and a second sensing voltage, respectively;

an analog to digital converter configured to convert the first sensing voltage and the second sensing voltage to a first digital code and a second digital code, respectively; and a decision circuit configured to compare the first digital code and the second digital code, and output the detection signal based on the comparison.

18. The NFC device of claim 12, wherein the transmitter comprises:

a first driver comprising first pull-up transistors connected in parallel between the transmission power supply voltage and the first transmission terminal, and first pull-down transistors connected in parallel between the first transmission terminal and a ground voltage;

a second driver comprising second pull-up transistors connected in parallel between the transmission power supply voltage and the second transmission terminal, and second pull-down transistors connected in parallel between the second transmission terminal and the ground voltage; and a controller configured to output driving signals to the first driver and the second driver based on a control signal from the processor.

\* \* \* \* \*